(12) United States Patent
Hayakawa

(10) Patent No.: US 9,696,417 B2
(45) Date of Patent: Jul. 4, 2017

(54) ANTENNA

(71) Applicant: FUJITSU TEN LIMITED, Kobe-shi, Hyogo (JP)

(72) Inventor: Eisuke Hayakawa, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 250 days.

(21) Appl. No.: 14/628,424

(22) Filed: Feb. 23, 2015

(65) Prior Publication Data

US 2015/0260836 A1 Sep. 17, 2015

(30) Foreign Application Priority Data

Mar. 11, 2014 (JP) .................................. 2014-047548

(51) Int. Cl.
*G01S 13/44* (2006.01)
*G01S 13/42* (2006.01)
(Continued)

(52) U.S. Cl.
CPC ............... *G01S 13/42* (2013.01); *G01S 7/03* (2013.01); *G01S 13/345* (2013.01); *G01S 13/424* (2013.01); *G01S 13/426* (2013.01); *G01S 13/44* (2013.01); *G01S 13/931* (2013.01); *H01Q 1/3233* (2013.01); *H01Q 13/206* (2013.01); *H01Q 21/0006* (2013.01);
(Continued)

(58) Field of Classification Search
CPC .. G01S 13/44; G01S 13/4409; G01S 13/4454; G01S 13/4463
See application file for complete search history.

(56) References Cited

U.S. PATENT DOCUMENTS 2,759,154 A * 8/1956 Smith ....................... G01S 1/02
333/122
3,344,424 A * 9/1967 Hacker ............... G01S 13/4409
342/149
(Continued)

FOREIGN PATENT DOCUMENTS

JP 1093321 A 4/1998
JP 10268029 A 10/1998
(Continued)

*Primary Examiner* — Peter Bythrow
(74) *Attorney, Agent, or Firm* — Oliff PLC

(57) ABSTRACT

An antenna includes a plurality of transmitting antennas that are: a first transmitting antenna that transmits a transmission wave in a right-upward direction relative to a reference axis substantially parallel to a road surface; a second transmitting antenna that transmits a transmission wave in a left-upward direction relative to the reference axis; a third transmitting antenna that transmits a transmission wave in a right-downward direction relative to the reference axis; and a fourth transmitting antenna that transmits a transmission wave in a left-downward direction relative to the reference axis. A transmission range of the transmission wave transmitted from each of the first transmitting antenna, the second transmitting antenna, the third transmitting antenna and the fourth transmitting antenna partially overlaps with the transmission ranges of the transmission waves transmitted from the transmitting antennas located in vicinity.

8 Claims, 29 Drawing Sheets

(51) Int. Cl.
  *H01Q 21/00* (2006.01)
  *G01S 7/03* (2006.01)
  *G01S 13/34* (2006.01)
  *H01Q 1/32* (2006.01)
  *H01Q 13/20* (2006.01)
  *H01Q 25/00* (2006.01)
  *G01S 13/93* (2006.01)
  *G01S 13/02* (2006.01)

(52) U.S. Cl.
  CPC ...... *H01Q 25/00* (2013.01); *G01S 2013/0245* (2013.01); *G01S 2013/9346* (2013.01); *G01S 2013/9375* (2013.01); *G01S 2013/9389* (2013.01)

(56) References Cited

U.S. PATENT DOCUMENTS

| | | | | |
|---|---|---|---|---|
| 3,378,843 A * | 4/1968 | Sherman | G01S 13/44 | 342/194 |
| 3,471,857 A * | 10/1969 | Schwartz | G01S 13/4409 | 342/153 |
| 3,568,190 A * | 3/1971 | Wong | H01P 5/16 | 333/117 |
| 3,728,726 A * | 4/1973 | Howard | G01S 13/4445 | 342/153 |
| 3,996,589 A * | 12/1976 | Breese | G01S 13/4472 | 342/104 |
| 4,011,564 A * | 3/1977 | Gulick, Jr. | G01S 13/4436 | 342/150 |
| 4,025,921 A * | 5/1977 | Brookner | G01S 1/02 | 342/155 |
| 4,380,765 A * | 4/1983 | Godfrey | G01S 7/03 | 342/153 |
| 4,501,399 A * | 2/1985 | Loomis, III | F41G 7/24 | 244/3.13 |
| 4,599,622 A * | 7/1986 | Haupt | G01S 13/4463 | 342/427 |
| 4,646,095 A * | 2/1987 | Kanter | G01S 13/4445 | 342/149 |
| 4,821,039 A * | 4/1989 | Crane | G01S 13/4409 | 342/149 |
| 4,937,584 A * | 6/1990 | Gabriel | G01S 7/2813 | 342/154 |
| 5,017,927 A * | 5/1991 | Agrawal | G01S 13/4463 | 342/154 |
| 5,017,929 A * | 5/1991 | Tsuda | G01S 13/4418 | 342/157 |
| 5,025,493 A * | 6/1991 | Cook, Jr. | H01Q 3/24 | 342/374 |
| 5,059,968 A * | 10/1991 | Thompson | G01S 13/4436 | 342/150 |
| 5,250,953 A * | 10/1993 | Jones | G01S 13/4454 | 244/3.19 |
| 5,307,077 A * | 4/1994 | Branigan | G01S 13/4463 | 342/53 |
| 5,315,304 A * | 5/1994 | Ghaleb | G01S 7/4004 | 342/151 |
| 5,334,984 A * | 8/1994 | Akaba | G01S 3/10 | 342/148 |
| 5,371,506 A * | 12/1994 | Yu | G01S 7/36 | 342/149 |
| 5,402,129 A * | 3/1995 | Gellner | G01S 13/348 | 342/70 |
| 5,471,220 A * | 11/1995 | Hammers | H01Q 21/0087 | 342/372 |
| 5,493,303 A * | 2/1996 | Kolak | G01S 7/032 | 342/149 |
| 5,546,089 A * | 8/1996 | Talbot | G01S 7/2927 | 342/159 |
| 5,598,163 A * | 1/1997 | Cornic | G01S 13/426 | 342/107 |
| 5,831,581 A * | 11/1998 | Keough | H01Q 21/0043 | 343/700 MS |
| 6,246,357 B1 * | 6/2001 | Uehara | G01S 13/345 | 342/133 |
| 6,320,541 B1 * | 11/2001 | Pozgay | G01S 13/44 | 342/149 |
| 6,456,238 B1 * | 9/2002 | Posey | G01S 13/44 | 342/149 |
| 6,618,008 B1 * | 9/2003 | Scholz | G01S 7/032 | 342/427 |
| 6,741,208 B1 * | 5/2004 | West | H01Q 3/02 | 342/155 |
| 6,762,711 B1 * | 7/2004 | Doerfler | G01S 13/4409 | 342/118 |
| 6,768,456 B1 * | 7/2004 | Lalezari | G01S 13/48 | 342/373 |
| 6,801,156 B1 * | 10/2004 | Wasiewicz | G01S 7/4052 | 342/140 |
| 8,173,945 B2 * | 5/2012 | Mentink | F41G 7/28 | 244/3.1 |
| 2003/0184473 A1 * | 10/2003 | Yu | G01S 7/2813 | 342/380 |
| 2005/0156780 A1 * | 7/2005 | Bonthron | G01S 3/48 | 342/107 |
| 2006/0158369 A1 * | 7/2006 | Shinoda | G01S 7/2925 | 342/70 |
| 2007/0182619 A1 * | 8/2007 | Honda | H01Q 25/02 | 342/80 |
| 2009/0015463 A1 * | 1/2009 | Tschernitz | G01S 7/036 | 342/146 |
| 2009/0267822 A1 * | 10/2009 | Shinoda | G01S 7/352 | 342/70 |
| 2011/0109500 A1 * | 5/2011 | Lynam | G01S 7/034 | 342/175 |
| 2011/0140953 A1 * | 6/2011 | Lynam | G01S 13/4409 | 342/153 |
| 2013/0057427 A1 * | 3/2013 | Haberland | G01S 7/4021 | 342/165 |
| 2013/0099895 A1 * | 4/2013 | Harpak | G06K 7/01 | 340/10.1 |
| 2013/0113651 A1 * | 5/2013 | Leise | H01Q 3/26 | 342/146 |
| 2013/0241778 A1 * | 9/2013 | Orime | H01Q 1/38 | 343/700 MS |
| 2014/0240023 A1 * | 8/2014 | Shaw | G06G 7/14 | 327/361 |
| 2015/0002329 A1 * | 1/2015 | Murad | G01S 7/2813 | 342/155 |
| 2015/0061923 A1 * | 3/2015 | Sato | G01S 13/4454 | 342/149 |

FOREIGN PATENT DOCUMENTS

| | | |
|---|---|---|
| JP | 2007240184 A | 9/2007 |
| JP | 2008096199 A | 4/2008 |

* cited by examiner

ANTENNA

BACKGROUND OF THE INVENTION

Field of the Invention

The invention relates to an antenna that transmits a transmission wave.

Description of the Background Art

A radar apparatus derives target information that represents a position and the like of an object (hereinafter referred to as "target") by transmitting transmission waves and then receiving reflection waves reflected from the target. A vehicle controller that acquires the target information output from the radar apparatus controls an accelerator and a brake for appropriate vehicle control.

The transmission waves transmitted by the radar apparatus are reflected by various targets existing around a host vehicle on which the radar apparatus is mounted, and the reflected waves are received by the radar apparatus. Examples of types of the targets are "control-required target," "upper target" and "lower target."

The type "control-required target" refers to a target that exists on a road on which the host vehicle equipped with the radar apparatus 1 is traveling, such as a preceding vehicle traveling in front of the host vehicle. If the host vehicle moves closer to the control-required target, the host vehicle and the control-required target may collide with each other. Therefore, in a case where the host vehicle gets closer to the control-required target, vehicle control is required, for example, to avoid a collision.

The type "upper target" refers to a target that exists above the road on which the host vehicle is traveling, such as a billboard and a traffic sign. Even in a case where the host vehicle moves closer to the upper target, there is no possibility of a collision of the host vehicle with the upper target. Therefore, if the host vehicle gets closer to the upper target, no vehicle control is required. The type "lower target" refers to a target that exists on the road on which the host vehicle is traveling, such as a manhole and a fallen object. Even in a case where the host vehicle moves closer to the lower target, there is no possibility of a collision of the host vehicle with the lower target. Therefore, if the host vehicle gets closer to the lower target, no vehicle control is required.

Conventionally, a radar apparatus includes three types of antennas: a horizontal antenna, an upper antenna, and a lower antenna. The horizontal antenna transmits transmission waves along a reference transmission axis in substantially parallel to a surface of the road. The upper antenna transmits transmission waves in an obliquely upward direction relative to the reference transmission axis. The lower antenna transmits transmission waves in an obliquely downward direction relative to the reference transmission axis. The reference transmission axis is a virtual transmission axis.

The control-required target, the upper target and the lower target exist in vertically different positions relative to the reference transmission axis. The radar apparatus transmits the transmission waves from the three types of the transmitting antennas in order and derives the vertical positions of the control-required target, the upper target and the lower target relative to the reference transmission axis. Then, the radar apparatus outputs the target information including the derived positions of the targets, to a vehicle controller, and the vehicle controller determines, based on the target information acquired from the radar apparatus, whether or not the vehicle control is required.

On the other hand, there is a need to transmit the transmission waves in a relatively wide range in a width direction of the host vehicle. In order to meet the need, at least two antennas each for the three types, 6 antennas in total, are required to cover a wider angle range in the width direction.

However, in a case where the radar apparatus includes the three types of the horizontal antenna, the upper antenna, and the lower antenna to realize "wider" angle to derive the three types of targets by transmitting the transmission waves in the relatively wide range in the width direction of the host vehicle, a relatively large area is required for installation of those antennas. Accordingly, a size of the radar apparatus becomes large so that the radar apparatus can be mounted only on limited portions of a vehicle. Moreover, the more the transmitting antennas are used, the more parts are required for the transmitting antennas, such as an electric power supply circuit that supplies transmission signals to those antennas. Thus, parts cost for manufacturing the radar apparatus also increases so that miniaturization and price reduction of the radar apparatus will be difficult.

SUMMARY OF THE INVENTION

According to one aspect of the invention, an antenna that transmits a transmission wave includes a plurality of transmitting antennas that are: a first transmitting antenna that transmits a transmission wave in a right-upward direction relative to a reference axis substantially parallel to a road surface; a second transmitting antenna that transmits a transmission wave in a left-upward direction relative to the reference axis; a third transmitting antenna that transmits a transmission wave in a right-downward direction relative to the reference axis; and a fourth transmitting antenna that transmits a transmission wave in a left-downward direction relative to the reference axis. A transmission range of the transmission wave transmitted from each of the first transmitting antenna, the second transmitting antenna, the third transmitting antenna and the fourth transmitting antenna partially overlaps with the transmission ranges of the transmission waves transmitted from the transmitting antennas located in vicinity. Without installation of a transmitting antenna for transmission in a horizontal direction, the antenna detects a target at a wider horizontal angle by using the two types of the transmitting antennas for transmission in the upward direction and in the downward direction. Moreover, the antenna derives targets, such as a control-required target, an upper target, a lower target and the like, existing in different positions in the vertical direction relative to the reference axis. Further a radar apparatus including the antenna can be smaller.

According to another aspect of the invention, the plurality of transmitting antennas transmit the transmission waves in order and transmit the transmission waves substantially simultaneously. The antenna includes a control-required target in the transmission range of the combined wave although the control-required target does not exist in the transmission ranges of the transmission waves transmitted from the plurality of transmitting antennas, and derives target information of the target.

Therefore, an object of the invention is to provide a technology that enables a radar apparatus including an antenna to be smaller.

These and other objects, features, aspects and advantages of the invention will become more apparent from the following detailed description of the invention when taken in conjunction with the accompanying drawings.

DESCRIPTION OF THE EMBODIMENTS

Embodiments of the invention are hereinafter explained with reference to the drawings.

First Embodiment

1-1. System Block Diagram

Figure 1:
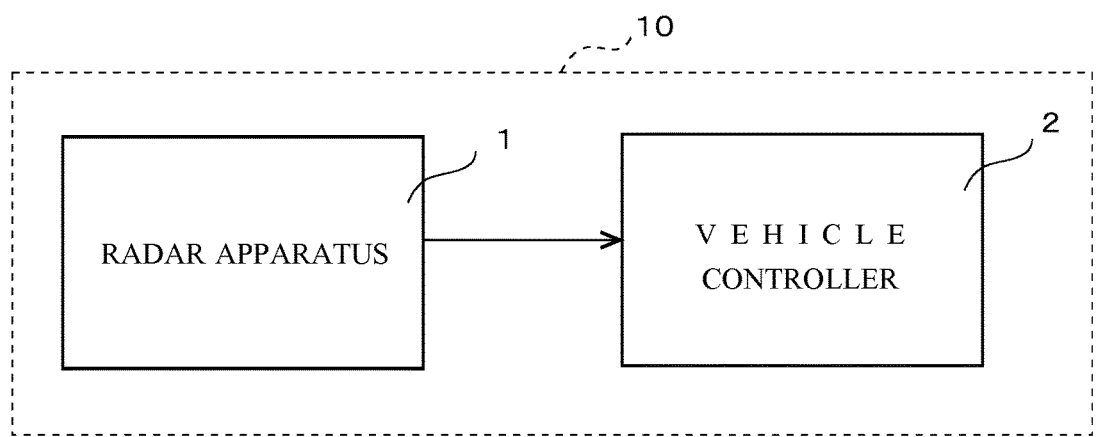
FIG. 1 illustrates a configuration of a vehicle control system in this embodiment.

FIG. 1 illustrates a configuration of a vehicle control system 10 in this embodiment. The vehicle control system 10 is mounted, for example, on a vehicle, such as a car. Hereinafter, a vehicle on which the vehicle control system 10 is mounted is referred to as "host vehicle." As shown in FIG. 1, the vehicle control system 10 includes a radar apparatus 1 and a vehicle controller 2.

The radar apparatus 1 of this embodiment acquires information of a target (an object) (hereinafter referred to as "target information"), such as a preceding vehicle existing in front of the host vehicle, using a frequency modulated continuous wave (FM-CW). The target information includes a longitudinal distance, a relative speed, a lateral distance, height information, etc. of the target. The longitudinal distance (m) is a value representing a distance from the target to a point where a receiving antenna of the radar apparatus 1 receives a reflection wave reflected by the target. The relative speed (km/h) is a value representing a speed of the target relative to the host vehicle. The lateral distance (m) is a value representing a distance from the radar apparatus 1 to a position of the target in a horizontal direction (a width direction) of the host vehicle. The height information is information representing a vertical height relative to a transmission reference axis (hereinafter referred to simply as "reference axis") that extends in substantially parallel to a road on which the host vehicle is traveling.

Moreover, the height information is information relating to a height level, which is different, depending on a control-required target, an upper target and a lower target. The control-required target is a target that exists on a road on which the host vehicle equipped with the radar apparatus 1 is traveling, such as a preceding vehicle traveling in front of the host vehicle. If the host vehicle moves closer to the control-required target, the host vehicle and the control-required target may collide with each other. Therefore, in a case where the host vehicle gets closer to the control-required target, vehicle control is required, for example, to avoid a collision.

The upper target is a target that exists above the road on which the host vehicle is traveling, such as a billboard and a traffic sign. Even in a case where the host vehicle moves closer to the upper target, there is no possibility of a collision of the host vehicle with the upper target. Therefore, if the host vehicle gets closer to the upper target, no vehicle control is required. The lower target is a target that exists on the road on which the host vehicle is traveling, such as a manhole and a fallen object. Even in a case where the host vehicle moves closer to the lower target, there is no possibility of a collision of the host vehicle with the lower target. Therefore, if the host vehicle gets closer to the lower target, no vehicle control is required.

The radar apparatus 1 outputs, to the vehicle controller 2, the target information including the height information of the control-required target, the upper target and the lower target.

The radar apparatus 1 derives an angle of the target based on phase information of reception signals by using a well-known angle estimation method. Then, the radar apparatus 1 calculates the lateral distance between the target and the host vehicle based on the derived angle of the target. Examples of the angle estimation method are: estimation of signal parameters via rotational invariance techniques (ES-PRIT); digital beam forming (DFB); propagator method based on an improved spatial-smoothing matrix (PRISM); and multiple signal classification (MUSIC).

The vehicle controller 2 is connected to a brake, a throttle, etc. of the host vehicle. The vehicle controller 2 acquires the target information output by the radar apparatus 1 and controls the host vehicle based on the acquired target information. Therefore, the vehicle controller 2 may be deemed as a data using apparatus that uses the target information. For example, the vehicle controller 2 uses the target information acquired from the radar apparatus 1 and follows a preceding vehicle, keeping a distance to the preceding vehicle constant. Thus the vehicle control system 10 in this embodiment functions as a preceding vehicle following system.

Moreover, for example, the vehicle controller 2 avoids a collision of the host vehicle with an object existing on the road in a traveling direction of the host vehicle to protect a passenger of the host vehicle by slowing the host vehicle down based on the target information acquired from the radar apparatus 1. Thus the vehicle control system 10 in this embodiment functions as a clash avoidance system.

1-2. Block Diagram of Radar Apparatus

Figure 2:
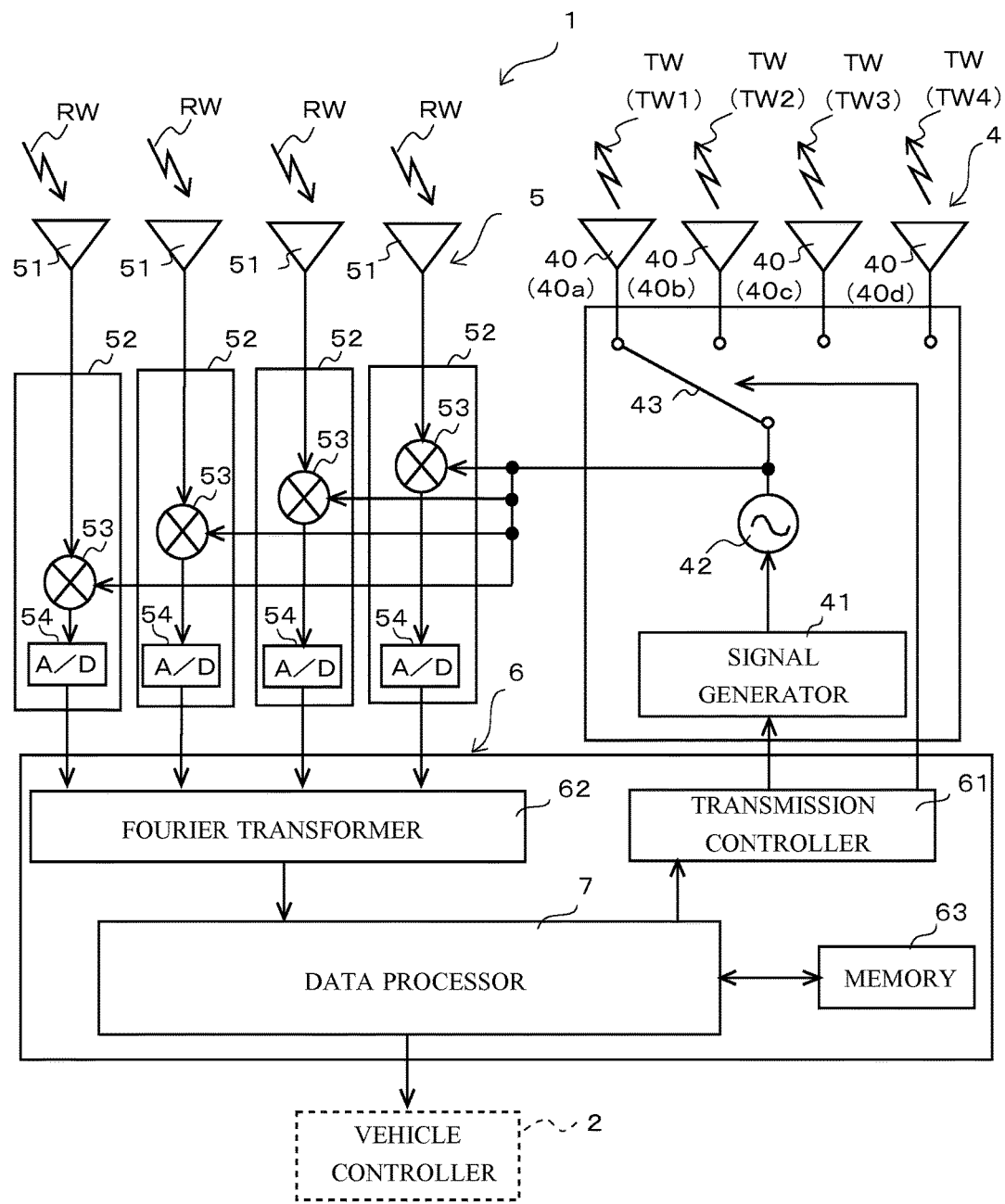
FIG. 2 illustrates a configuration of a radar apparatus.

FIG. 2 illustrates a configuration of the radar apparatus 1. The radar apparatus 1 that is mounted, for example, in a front grille of the host vehicle transmits a transmission wave to an outside of the host vehicle and receives a reflection wave from a target. Moreover, the radar apparatus 1 includes a transmitter 4, a signal receiver 5 and a signal processor 6.

The transmitter 4 includes a signal generator 41, an oscillator 42 and a switch 43. The signal generator 41 generates a modulation signal such that voltage of the modulation signal changes in a triangular waveform and outputs the signal to the oscillator 42. The oscillator 42 modulates frequency of a continuous wave signal based on the modulation signal generated by the signal generator 41 to generate a transmission signal of which frequency changes as time passes, and then outputs the generated transmission signal to a transmitting antenna 40.

The switch 43 connects the oscillator 42 to one of transmitting antennas 40a, 40b, 40c and 40d. Connection to one of the transmitting antennas 40a to 40d via the switch 43 is changed every predetermined time period (e.g. every 5 msec.) by control of a transmission controller 61, described later. As a result, the oscillator 42 is connected to each of the transmitting antennas 40a to 40d for a same time period. Thus the transmitting antennas that transmit the transmission waves are changed over by the switch 43.

The transmitting antenna 40 transmits a transmission wave TW to the outside of the host vehicle based on the transmission signal. The transmitting antenna 40 includes the four transmitting antennas 40a, 40b, 40c and 40d. The transmitting antennas 40a to 40d transmit transmission waves TW1, TW2, TW3 and TW4, respectively, and are changed over by the switch 43 at a predetermined cycle. As described above, one transmitting antenna connected to the oscillator 42 via the switch 43 transmits the transmission wave TW.

The receiver 5 includes: plural receiving antennas 51 configuring an array antenna; and plural individual receivers 52 connected to the plural receiving antennas 51, respectively. In this embodiment, the receiver 5 includes, for example, the four receiving antennas 51 and the four individual receivers 52. The four individual receivers 52 correspond to the four receiving antennas 51, respectively. The receiving antennas 51 receive reflection waves RW from the target and the individual receivers 52 process reception signals received by the corresponding receiving antennas 51.

Each of the individual receivers 52 includes a mixer 53 and an AD converter 54. After the reception signal acquired from the reflection wave RW received by each of the receiving antennas 51 is amplified by a low noise amplifier (not illustrated), the reception signal is sent to the mixer 53.

The transmission signal is input to the mixer 53 from the oscillator 42 of the transmitter 4. The transmission signal and the reception signal are mixed by the mixer 53, and thus a beat signal is generated. The beat signal represents a beat frequency that is a frequency difference between the transmission signal and the reception signal. After the beat signal generated by the mixer 53 is converted into a digital signal by the AD converter 54, the digital beat signal is output to the signal processor 6.

The signal processor 6 includes a microcomputer that has a CPU, a memory 63, etc. The signal processor 6 stores various data for calculation in the memory 63, a storage device. An erasable programmable read only memory (EPROM) and a flash memory are examples of the memory 63. The signal processor 6 includes the transmission controller 61, a Fourier transformer 62 and a data processor 7 as functions implemented by software of the microcomputer. The transmission controller 61 controls the signal generator 41 of the transmitter 4 to control the change-over of the switch 43.

The Fourier transformer 62 performs fast Fourier transformation (FFT) of the beat signal output from each of the plural individual receivers 52. Thus, the Fourier transformer 62 transforms the beat signal relating to the reception signal received by each of the plural receiving antennas 51 to a frequency spectrum that is data of a frequency range. The frequency spectrum acquired by the Fourier transformer 62 is output to the data processor 7.

The data processor 7 derives the target information based on the frequency spectrum transformed from the reception signal received by each of the plural receiving antennas 51. The data processor 7 outputs the derived target information to the vehicle controller 2.

1-3. Antenna Configuration

Figure 3:
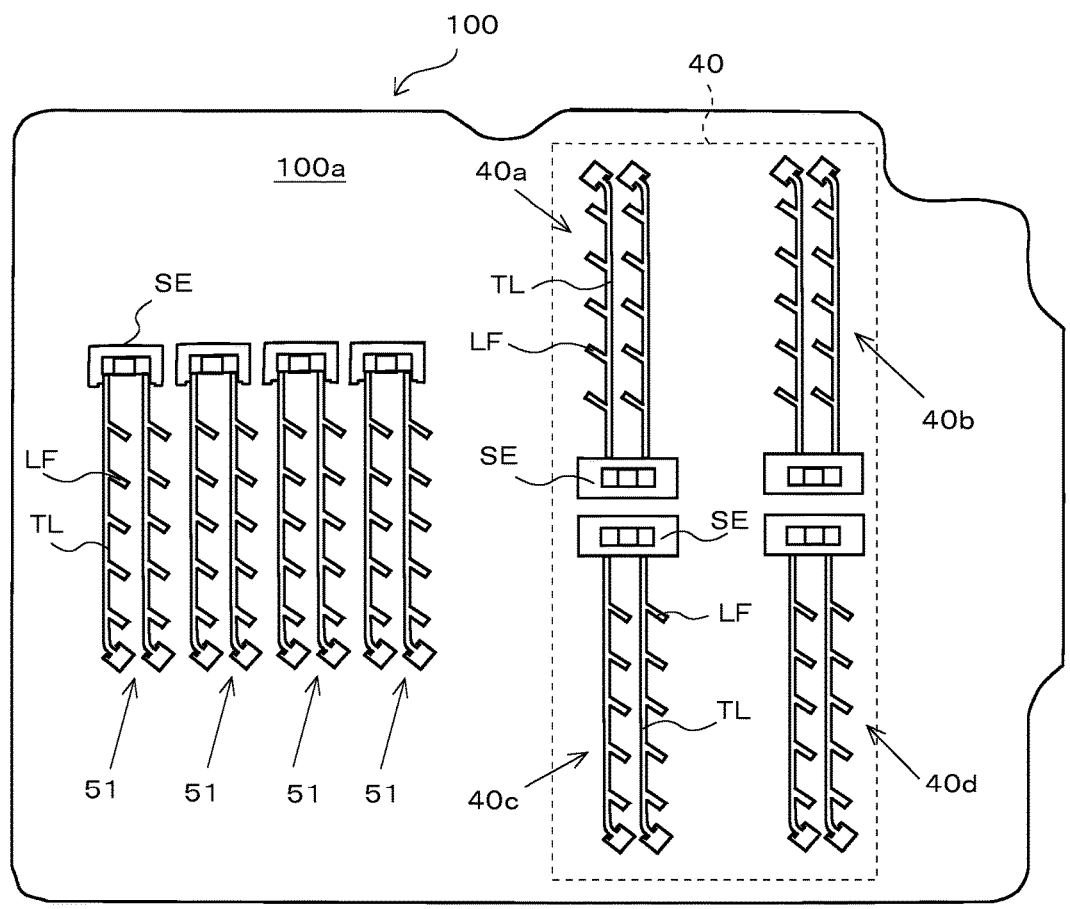
FIG. 3 illustrates a configuration of an antenna.

Next, a configuration of an antenna 100 that includes the transmitting antenna 40 and the receiving antennas 51 is explained. FIG. 3 illustrates the configuration of the antenna 100. First explained are directions defined in a state where the antenna 100 of the radar apparatus 1 is mounted on the host vehicle. A z-axis direction refers to a vertical direction relative to the reference axis (a height direction of the host vehicle). An x-axis direction refers to a horizontal direction relative to the reference axis (the width direction of the host vehicle). A y-axis direction refers to a front-back direction relative to the reference axis (the traveling direction of the host vehicle).

An upper side above the reference axis is a +z direction and a lower side below the reference axis is a −z direction. A left side from the reference axis is a +x direction and a right side from the reference axis is a −x direction. A back side of the reference axis is a +y direction and a front side of the reference axis is a −y direction.

The antenna 100 includes the transmitting antenna 40 and the receiving antennas 51 on a mounted surface of a dielectric substrate 100a. The transmitting antenna 40 includes the four transmitting antennas 40a to 40d. Two transmitting antennas of the transmitting antenna 40 are arranged in parallel in two lines in the horizontal direction (x-axis direction). Concretely, the transmitting antenna 40a and the transmitting antenna 40b are arranged in parallel, and the transmitting antenna 40c and the transmitting antenna 40d are arranged in parallel. Moreover, a pair of the transmitting antennas of the transmitting antenna 40 arranged in parallel is arranged immediately above or below another pair of the transmitting antennas arranged in parallel, in the vertical direction (z-axis direction). Concretely, a pair of the transmitting antenna 40a and the transmitting antenna 40b is arranged immediately above a pair of the transmitting antenna 40c and the transmitting antenna 40d. As described above, the transmitting antennas 40a to 40d are arranged in two lines and in two rows in the horizontal direction and in the vertical direction.

Each of the transmitting antennas 40a to 40d has two transmission lines TL connected to a power feeding port SE, and plural antenna elements LF are provided to each of the transmission lines TL. Each of the transmission lines TL delivers, to the plural antenna elements LF, the transmission signals delivered via the power feeding port SE. A transmission direction of the transmission wave is defined by an interval and the like between the plural antenna elements LF provided to a same transmission line TL.

The power feeding port SE for one of transmitting antennas 40a to 40d disposed to an upper line (e.g. the transmitting antenna 40a) and the power feeding port SE for one of transmitting antennas 40a to 40d disposed to a lower line (e.g. the transmitting antenna 40c) are provided close to each other around a substantial center line (x-axis direction) of the dielectric substrate 100a. The transmission lines TL for the transmitting antenna 40a in the upper line and the transmission lines TL for the transmitting antenna 40c in the lower line are extended in opposite directions to each other from the power feeding ports SE. Since being configured as described above, the transmitting antenna 40 transmits the transmission waves in an upward direction and in a downward direction relative to the reference axis.

The plural receiving antennas 51 are, for example, four receiving antennas. Each of the plural receiving antennas 51 are arranged in parallel in the horizontal direction (x-axis direction) such that each of the plural receiving antennas 51 is extended in the vertical direction (z-axis direction). Moreover, each of the plural receiving antennas 51 has two transmission lines TL connected to a power feeding port SE, and plural antenna elements LF are provided to each of the transmission lines TL. The antenna elements LF provided to each of the plural receiving antennas 51 receive the reflection waves and deliver the received signals via the transmission lines TL to the power feeding port SE.

1-4. Transmission Range

Figure 4A:
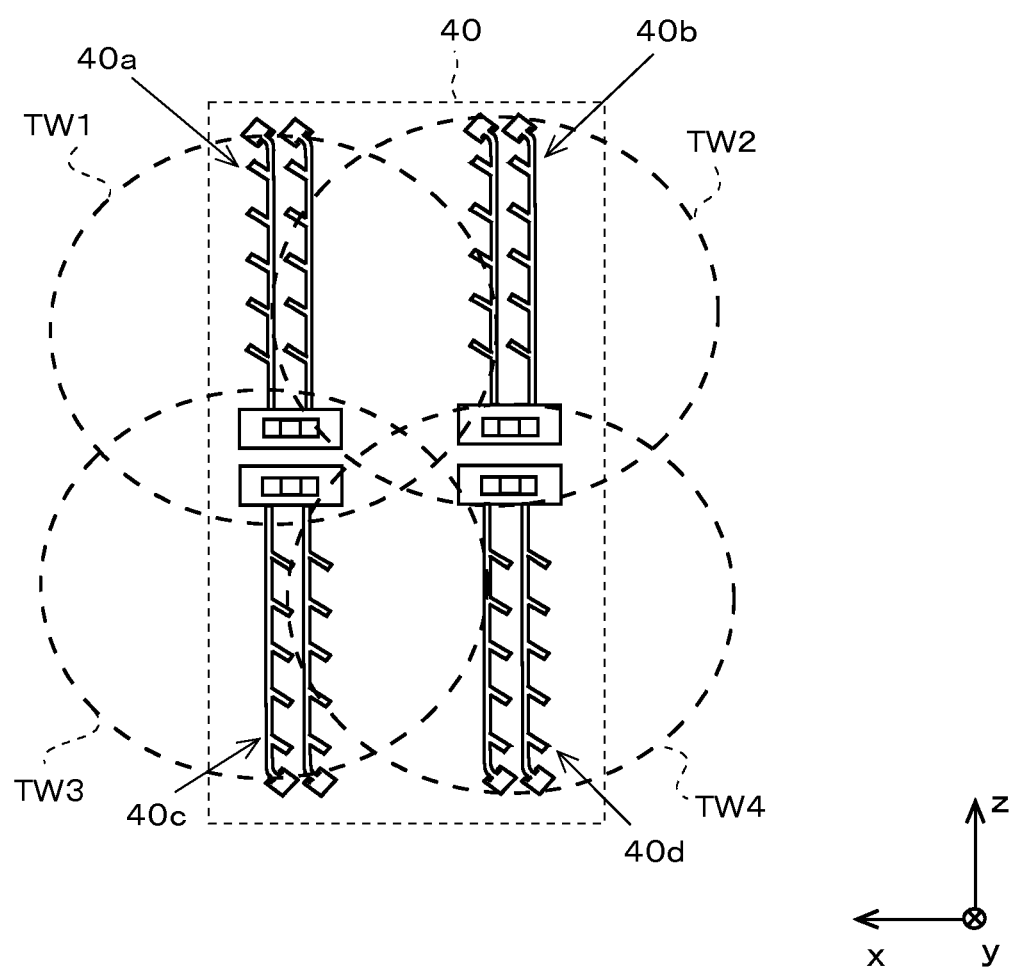
FIG. 4A illustrates a transmitting antenna viewed toward a rear side from a viewpoint located in front.
Figure 4B:
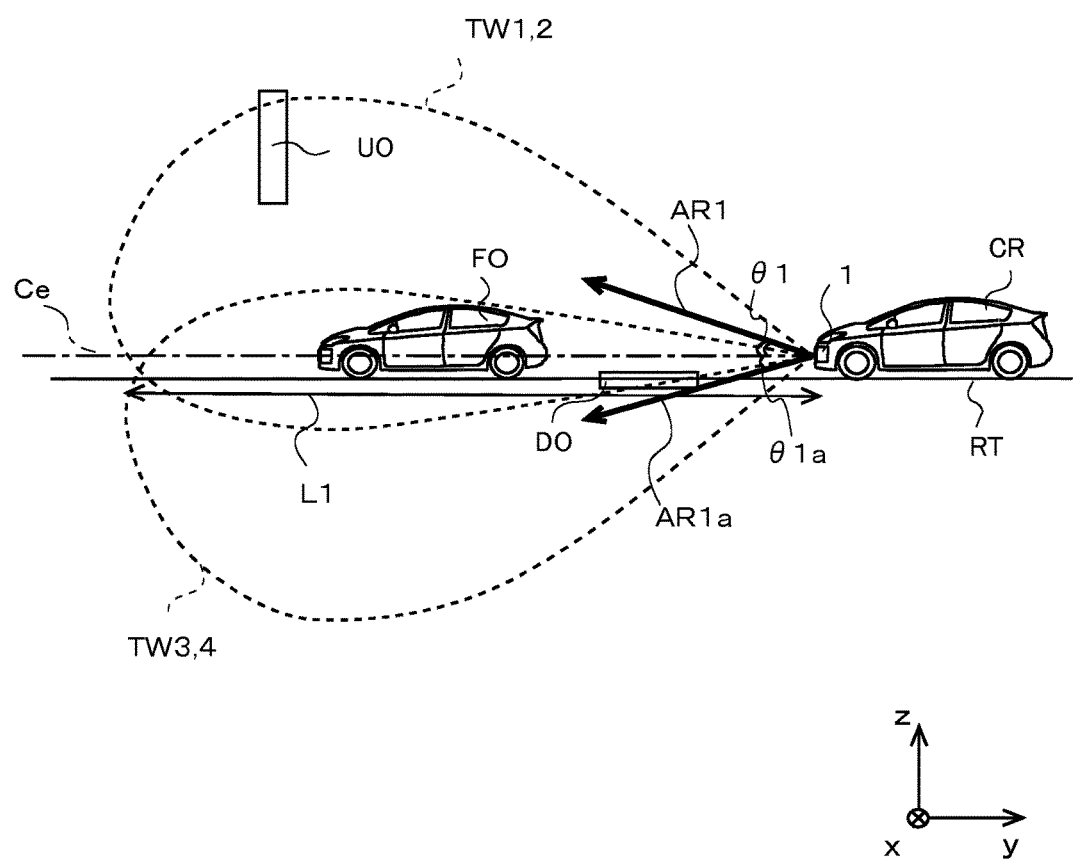
FIG. 4B illustrates a host vehicle viewed from a left side to a right side of the host vehicle.
Figure 4C:
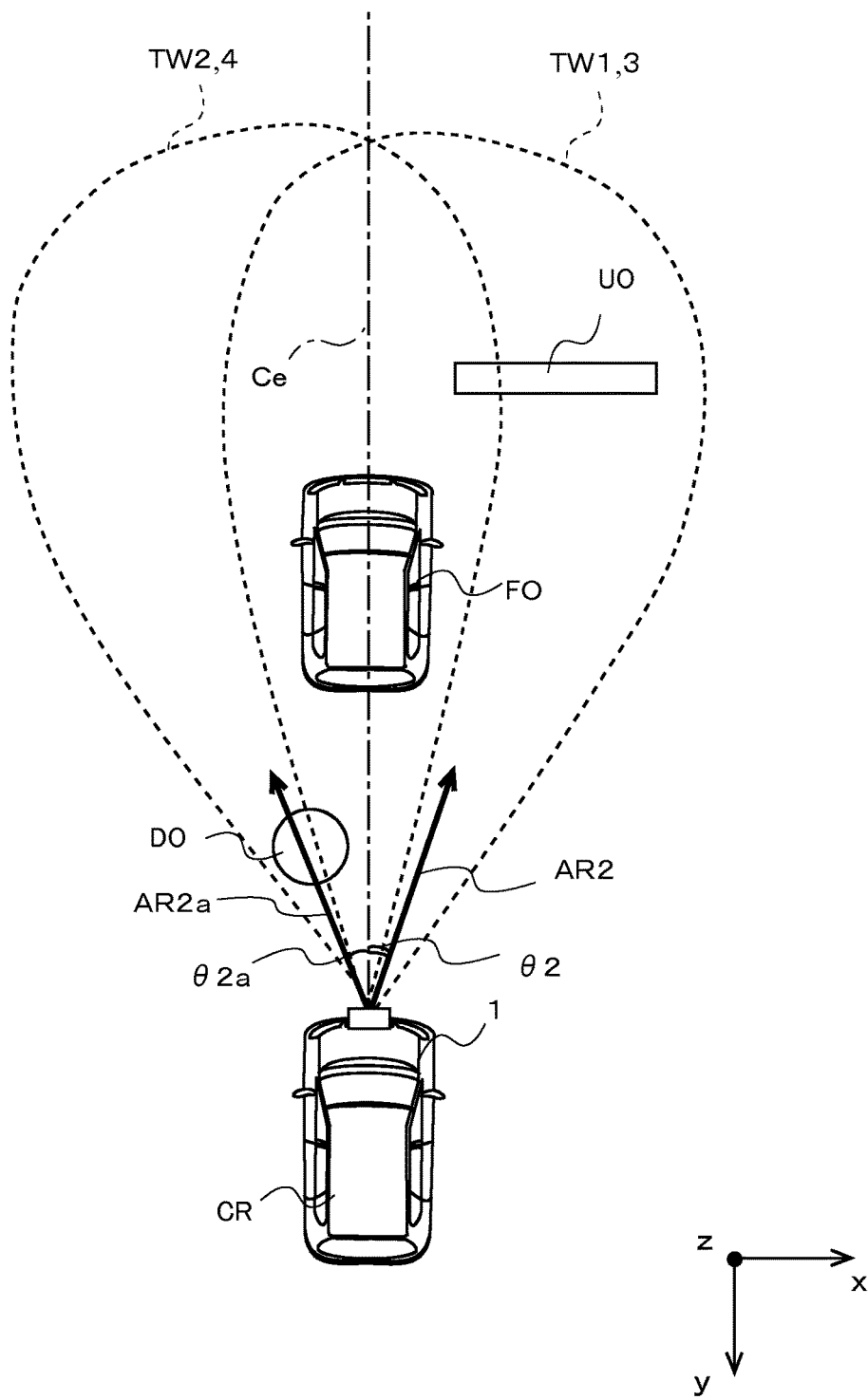
FIG. 4C illustrates the host vehicle viewed downward from a viewpoint above the host vehicle.

Next explained are transmission ranges of the transmission waves transmitted from the transmitting antenna 40. Each of FIG. 4A, FIG. 4B and FIG. 4C illustrates the transmission ranges of the transmission waves. First explained is the transmission ranges of the transmission waves viewed toward a rear side of the host vehicle from a viewpoint located in front of the host vehicle in the traveling direction of the host vehicle. FIG. 4A illustrates the transmitting antenna 40 viewed toward the rear side of the host vehicle from the viewpoint located in front of the host vehicle (from the −y direction to the +y direction). The transmission waves are transmitted from the radar apparatus 1 mounted on the host vehicle. The transmitting antenna 40 transmits the transmission waves TW1, TW2, TW3 and TW4 in order, and each of the transmission waves TW1 to TW4 has a predetermined transmission range. Each of the transmission ranges of the transmission waves TW1 to TW4 partially overlaps with the transmission ranges of the transmission waves transmitted from the transmitting antennas located in vicinity.

For example, the transmission range of the transmission wave TW1 from the transmitting antenna 40a overlaps with the transmission range of the transmission wave TW2 from the transmitting antenna 40b on a right side (−x direction) next to the transmitting antenna 40a, with the transmission range of the transmission wave TW3 from the transmitting antenna 40c immediately below (−z direction) the transmitting antenna 40a and with the transmission range of the transmission wave TW4 from the transmitting antenna 40d on a right-lower side of the transmitting antenna 40a. As described above, the transmission range of the transmission wave transmitted from one of the transmitting antennas partially overlaps with the transmission ranges of the transmission waves transmitted from all of the other transmitting antennas.

Next explained is the transmission ranges of the transmission waves TW1 to TW4 viewed from a viewpoint located a side of the host vehicle. FIG. 4B illustrates a host vehicle CR viewed from a left side to a right side of the host vehicle CR. The transmitting antenna 40a transmits the transmission wave TW1 in an obliquely upward direction relative to a reference axis Ce. The reference axis Ce is a virtual axis substantially parallel to a road surface RT. The transmitting antenna 40b transmits the transmission wave TW2 in the obliquely upward direction relative to the reference axis Ce. The transmitting antenna 40c transmits the transmission wave TW3 in an obliquely downward direction relative to the reference axis Ce. The transmitting antenna 40d transmits the transmission wave TW4 in the obliquely downward direction relative to the reference axis Ce.

Concretely, the transmission waves TW1 and TW2 are transmitted in a direction shown by an arrow AR1. In a case where an angle in the vertical direction (hereinafter referred to as "vertical angle") of the reference axis Ce is ±0°, a vertical angle of the arrow AR1 is θ1° (e.g., +5°). Moreover, the transmission waves TW3 and TW4 are transmitted in a direction shown by an arrow AR1a. In the case where the vertical angle of the reference axis Ce is ±0°, a vertical angle of the arrow AR1a is θ1a° (e.g., −5°).

As described above, the transmission ranges of the transmission waves TW1 and TW3 are extended in the obliquely upward direction and in the obliquely downward direction, respectively, relative to the reference axis Ce, and are substantially symmetrical to each other. Moreover, the transmission ranges of the transmission waves TW2 and TW4 are extended in the obliquely upward direction and in the obliquely downward direction, respectively, relative to the reference axis Ce, and are substantially symmetrical to each other. Thus a control-required target FO, an upper target UO and a lower target DO are included in the transmission ranges of the radar apparatus 1 equipped with the transmitting antenna 40 and are derived by the radar apparatus 1. In other words, the radar apparatus 1 derives all of the control-required target FO, the upper target UO and the lower target DO of which the height information is different from one another.

The radar apparatus 1 is configured to derive the target existing in a longitudinal distance L1 from the host vehicle CR to each of end points of the transmission ranges of the transmission waves TW1 to TW4. The radar apparatus 1 receives the reflection wave from the target and derives a position of the target existing within a distance, e.g., 60 m, from a position of the host vehicle CR defined as 0 m. In the case where the vertical angle of the reference axis Ce is ±0°, a maximum vertical angle range of the transmission range of each of the transmission waves TW1 to TW4 is, e.g., ±12°.

Next explained are the transmission ranges of the transmission waves TW1 to TW4 viewed from a viewpoint located above the host vehicle CR. FIG. 4C illustrates the host vehicle CR viewed downward from the viewpoint above the host vehicle CR (from the +z direction to the −z direction). As shown in FIG. 4C, the transmission waves TW1 and TW3 are transmitted in an obliquely rightward direction relative to the reference axis Ce and the transmission waves TW2 and TW4 are transmitted in an obliquely leftward direction relative to the reference axis Ce. In other words, the transmission waves TW1 and TW3 are transmitted in a direction shown by an arrow AR2. Concretely, in a case where an angle in the horizontal direction (hereinafter referred to as "horizontal angle") of the reference axis Ce is ±0°, a horizontal angle of the arrow AR2 is θ2° (e.g., +7°).

Moreover, the transmission waves TW2 and TW4 are transmitted in a direction shown by an arrow AR2a. Concretely, in the case where the horizontal angle of the reference axis Ce is ±0°, a horizontal angle of the arrow AR2a is θ2a° (e.g., −7°).

In other words, the transmission waves TW1 is transmitted in an right-upward direction relative to the reference axis Ce and the transmission waves TW3 is transmitted in an right-downward direction relative to the reference axis Ce. Moreover, the transmission waves TW2 is transmitted in an left-upward direction relative to the reference axis Ce and the transmission waves TW4 is transmitted in an left-downward direction relative to the reference axis Ce.

The transmission ranges of the transmission waves TW1 and TW2 are substantially left-right symmetrical to each other relative to the reference axis Ce. The transmission ranges of the transmission waves TW3 and TW4 are substantially left-right symmetrical to each other relative to the reference axis Ce. Thus the control-required target FO, the upper target UO and the lower target DO are included in the transmission ranges of the radar apparatus 1 equipped with the transmitting antenna 40 and are derived by the radar apparatus 1 although the lateral distances of the control-required target FO, the upper target UO and the lower target DO are different from one another. In the case where the horizontal angle of the reference axis Ce is ±0°, a maximum horizontal angle range of the transmission range of each of the transmission waves TW1 to TW4 is, e.g., ±25°.

As described above, by transmitting the transmission waves in the right-upward direction, in the left-upward direction, in the right-downward direction and in the left-downward direction relative to the reference axis Ce, the transmitting antennas 40a to 40d transmit the transmission waves upward, downward, leftward and rightward relative to the reference axis Ce. As a result, the radar apparatus 1 detects the target in a wide detection range.

1-5. Transmission Timing of Transmission Waves

Figure 5:
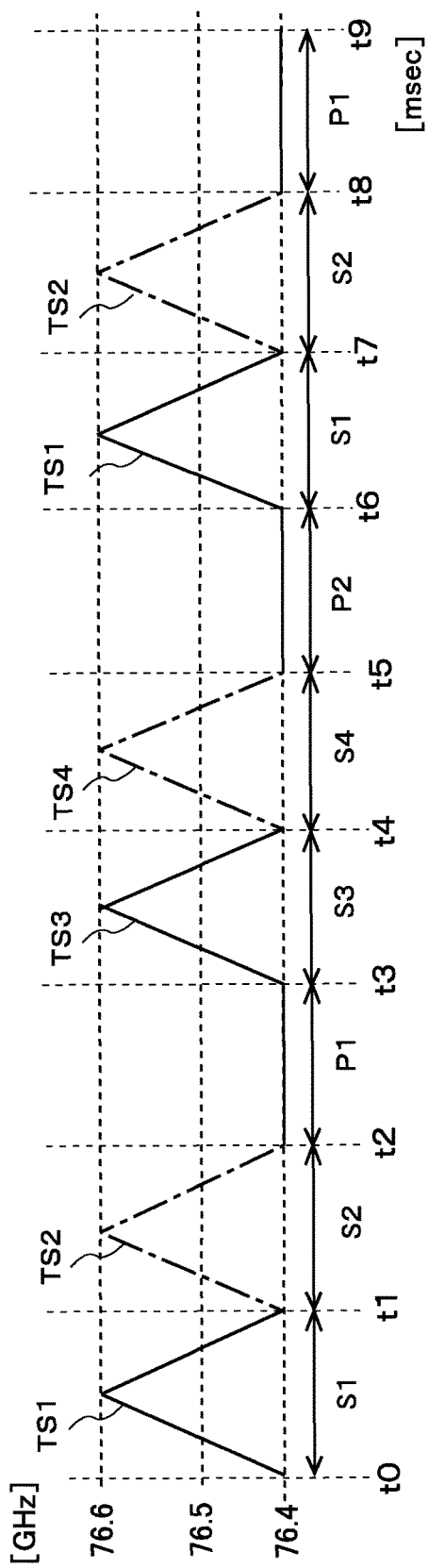
FIG. 5 illustrates timings when a transmitting antenna transmits transmission waves.

Next described are timings when the transmitting antenna 40 transmits the transmission waves. FIG. 5 illustrates the timings when the transmitting antenna 40 transmits the transmission waves TW1 to TW4. A vertical axis in FIG. 5 represents frequency [GHz] and a horizontal axis in FIG. 5 represents time [msec.]. Transmission signals TS1, TS2, TS3 and TS4 correspond to the transmission waves TW1, TW2, TW3 and TW4, respectively. Frequency of each of the transmission signals TS1 to TS4 increases to a first predetermined frequency (e.g., 76.6 GHz) and then decreases to a second predetermined frequency (e.g., 76.4 GHz) with a center frequency, for example, 76.5 GHz. In other words, the transmission signals TS1 to TS4 repeat a constant change within a predetermined frequency range (e.g., within 200 MHz).

Here, a time period from a time point t0 to a time point t1 refers to as a first transmission period S1 and a time period from the time point t1 to a time point t2 refers to as a second transmission period S2. In the first transmission period S1, the transmitting antenna 40a transmits the transmission wave TW1 corresponding to the transmission signal TS1. In the second transmission period S2, the transmitting antenna 40b transmits the transmission wave TW2 corresponding to the transmission signal TS2.

At the time point t0, the switch 43 connects the transmitting antenna 40a to the oscillator 42, and the transmitting antenna 40a transmits the transmission wave TW1 in the right-upward direction relative to the reference axis Ce in the first transmission period S1.

At the time point t1, the switch 43 connects the transmitting antenna 40b to the oscillator 42, and the transmitting antenna 40b transmits the transmission wave TW2 in the left-upward direction relative to the reference axis Ce in the second transmission period S2.

In a time period from the time point t2 to a time point t3, the target information is derived based on the reflection waves that are the transmission waves TW1 and TW2 reflected by the target. The time period from the time point t2 to the time point t3 refers to as a first processing period P1.

A time period from the time point t3 to a time point t4 refers to as a third transmission period S3 and a time period from the time point t4 to a time point t5 refers to as a fourth transmission period S4.

At the time point t3, the switch 43 connects the transmitting antenna 40c to the oscillator 42, and the transmitting antenna 40c transmits the transmission wave TW3 in the right-downward direction relative to the reference axis Ce in the third transmission period S3.

At the time point t4, the switch 43 connects the transmitting antenna 40d to the oscillator 42, and the transmitting antenna 40d transmits the transmission wave TW4 in the left-downward direction relative to the reference axis Ce in the fourth transmission period S4.

In a time period from the time point t5 to a time point t6, the target information is derived based on the reflection waves that are the transmission waves TW3 and TW4 reflected by the target. The time period from the time point t5 to the time point t6 refers to as a second processing period P2.

A time period (the time point from t0 to the time point t6) that is a sum of the first transmission period S1 to the fourth transmission period S4 and the first processing period P1 to the second processing period P2 is defined as a one cycle of a process to acquire the target information (hereinafter referred to as "target deriving process"), and the cycle is repeated. Thus the transmission waves TW1 to TW4 are transmitted in order by the transmitting antennas 40a to 40d.

In a case where the radar apparatus 1 continuously transmits the transmission waves TW1 to TW4, a circuit in the radar apparatus 1 may be heated and the radar apparatus 1 may be damaged by the heat from the circuit inside the radar apparatus 1. Therefore, as described with reference to FIG. 5, the two transmitting antennas 40a and 40b of the transmitting antenna 40 transmit the transmission waves TW1 and TW2 in order. The data processor 7 derives a target in the first processing period P1 based on the reflection waves of the transmission waves TW1 and TW2.

After the process in the first processing period P1, the two transmitting antennas 40c and 40d of the transmitting antenna 40 transmit the transmission waves TW3 and TW4 in order. The data processor 7 derives a target in the second processing period P2 based on the reflection waves of the transmission waves TW3 and TW4. As described above, since the target deriving process is performed in intervals between the transmission periods in which the transmission waves are transmitted in order, the transmission waves are not transmitted continuously. Thus, the circuit in the radar apparatus 1 is prevented from being heated and the radar apparatus 1 is also prevented from being damaged.

1-6. Process Flowchart

Figure 6:
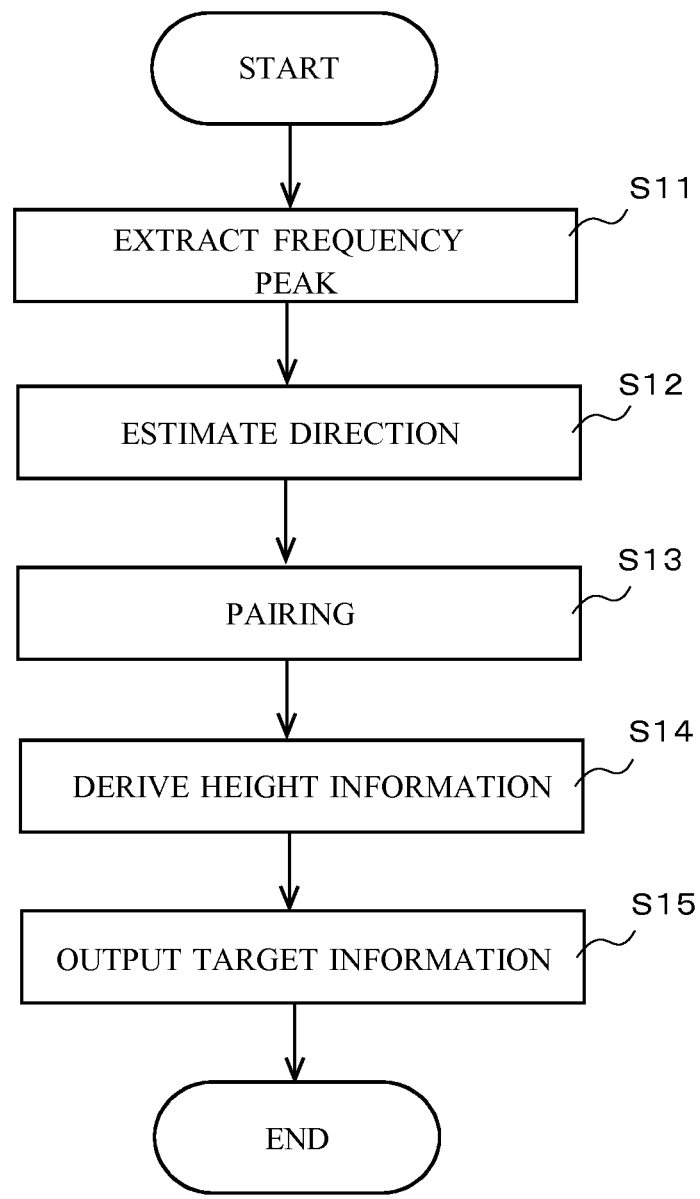
FIG. 6 illustrates a flow of a target deriving process.

Next described is an entire flow of the target deriving process performed by the data processor 7. In the target deriving process, the data processor 7 of the radar apparatus 1 derives the target information of the target and outputs the derived target information to the vehicle controller 2. FIG. 6 illustrates the flow of the target deriving process. The data processor 7 continuously repeats the target deriving process at a predetermined time cycle (e.g., $\frac{1}{20}$ sec-cycle). At a start point of the target deriving process, the data processor 7 has already received, from the Fourier transformer 62, the frequency spectrums for all of the four receiving antennas 51 about both of an up period in which the transmission signals increase to the first predetermined frequency and a down period in which the transmission signals decrease to the second predetermined frequency from the first determined frequency.

The data processor 7 extracts a peak of the frequency (hereinafter referred to as "frequency peak") from the frequency spectrums (a step S11). Concretely, the data processor 7 extracts a frequency peak exceeding a predetermined signal level threshold, from the frequency spectrums in the up period and in the down period.

Next, the data processor 7 estimates a horizontal angle, relative to the road surface RT, of the target associated with the extracted frequency peak in a direction calculation process by using ESPRIT and the like (a step S12). The data processor 7 estimates individual horizontal angles of the plural targets of the control-required target FO, the upper target UO and the lower target DO, if any.

Next, the data processor 7 pairs a peak signal in the up period and a peak signal in the down period based on a reliable degree of pairing (a step S13). The data processor 7 calculates Mahalanobis distances of all possible pairs of the peak signals in the up period and the peak signals in the down period and the data processor 7 derives, as a pair data set, a pair of which the Mahalanobis distance is a smallest value.

Next, the data processor 7 derives the height information of the pair data set (a step S14). Here, the height information is, for example, derived as follows. The data processor 7 determines whether or not a pair data set generated from the reception signals corresponding to the reflection waves of the transmission waves TW1 and TW2 transmitted in the obliquely upward direction (hereinafter referred to as "first pair data set") and a pair data set generated from the reception signals corresponding to the reflection waves of the transmission waves TW3 and TW4 transmitted in the obliquely downward direction (hereinafter referred to as "second pair data set") are associated with a same target.

The data processor 7 determines whether or not the two pair data sets are associated with the same target, based on whether or not a difference between the target information (longitudinal distance, relative speed, lateral distance, etc.) of the first pair data set and the target information of the second pair data set is within a predetermined value. In a case where the difference between the target information of the two pair data sets is within the predetermined value, the data processor 7 determines that the two pair data sets are associated with the same target.

Then the data processor 7 compares reception levels of the peak signals of the two pair data sets determined as being associated with the same target. Concretely, the data processor 7 compares the reception level of the reception signal of the transmission wave TW1 or the transmission wave TW2 transmitted in the obliquely upward direction (hereinafter referred to as "first reception level") with the reception level of the reception signal of the transmission waves TW3 or the transmission wave TW4 transmitted in the obliquely downward direction (hereinafter referred to as "second reception level").

In a case where the first reception level is greater than the second reception level by the predetermined value, the data processor 7 derives the height information representing that the pair data sets associated with the same target represent the upper target UO. In a case where the second reception level is greater than the first reception level by the predetermined value, the data processor 7 derives the height information of the pair data sets representing that the pair data sets associated with the same target represent the lower target DO. In a case where the height information of the pair data sets is derived as the upper target UO or the lower target DO, the pair data sets represent the target that has no possibility of collision with the host vehicle CR. Therefore, the target information of the pair data sets is not output to the vehicle controller 2.

On the other hand, in a case where the difference between the first reception level and the second reception level is within the predetermined value, the data processor 7 derives the height information representing that the pair data sets associated with the same target represent the control-required target FO. The data processor 7 outputs, to the vehicle controller 2, the target information of the pair data sets derived as the control-required target FO (a step S15 in FIG. 6).

In a case where the first pair data set and the second pair data set are not associated with a same target, the data processor 7 derives predetermined height information. For example, in a case where there is no second pair data set that is associated with the target with which the first pair data set is associated, the data processor 7 derives the height information representing that the first pair data set represents the upper target UO. Moreover, in a case where there is no first pair data set that is associated with the target with which the second pair data set is associated, the data processor 7 derives the height information representing that the second pair data set represents the lower target DO.

As described above, in this embodiment, the radar apparatus 1 includes the four transmitting antennas and transmits the transmission waves in order in the four directions, right-upward, left-upward, right-downward and left-downward, relative to the reference axis Ce. Accordingly, the transmission ranges of the transmission waves are the predetermined ranges upper, lower, left and right than/from the traveling direction of the host vehicle CR that is the same as the direction in which the reference axis Ce extends.

Moreover, the transmission range of the transmission wave transmitted from each transmitting antenna of the transmitting antenna 40 partially overlaps with the transmission ranges of the transmission waves transmitted from the transmitting antennas located in vicinity. Accordingly, the radar apparatus 1 is configured to transmit the transmission waves of which the predetermined transmission ranges defined by the directions upper, lower, left and right relative to the direction in which the reference axis Ce extends. As a result, any of the control-required target FO, the upper target UO and the lower target DO that exist in the traveling direction of the host vehicle CR is included in the transmission range of the radar apparatus 1 and the radar apparatus 1 derives the target information of those targets.

Accordingly, without installation of a transmitting antenna for transmitting a transmission wave in a wider transmission range in the horizontal direction, the radar apparatus 1 detects a target at a wider horizontal angle by using the two types of the transmitting antennas that transmit the transmission waves in the obliquely upward direction and in the obliquely downward direction. Moreover, the radar apparatus 1 derives the target information of the targets existing in different positions in the vertical direction relative to the reference axis Ce. As a result, once the vehicle controller 2 acquires the target information from the radar apparatus 1, appropriate vehicle control can be performed by the vehicle controller 2.

As described above, the radar apparatus 1 derives the angle of the position of the target based on a phase difference between the reception signals received by the plural receiving antennas 51. The radar apparatus 1 is configured to detect the phase difference in a range from −360 degrees to +360 degrees. Therefore, even a target existing beyond the range is mistakenly detected as a target existing within the range. In other words, the phase difference of the target is calculated within the range. Therefore, an angle estimated by the radar apparatus 1 may be different from an actual angle of an actual position of the target. Such a phenomenon is called "phase folding."

In a case where the phase difference of the reception signals associated with the target is a value A (e.g., a phase difference A), an actual phase difference may any one of the phase difference A (−360 degrees to +360 degrees), a phase difference A1 (the phase difference A +360 degrees) and a phase difference A2 (the phase difference A −360 degrees). However, in the all cases of the phase difference A, the phase difference A1 and the phase difference A2, the radar apparatus 1 estimates an angle of the position of the target based on the phase difference A. In other words, the three phase differences A, A1 and A2 are not distinguished by the radar apparatus 1.

Therefore, the radar apparatus 1 includes the two transmitting antennas (e.g., the transmitting antennas 40a and 40b) that transmit the transmission waves in the two different horizontal directions and determines whether or not there is a phase holding, based on an angle of the target estimated based on the phase difference of the reflection waves of the transmission waves transmitted from the two antennas; and based on a difference of peak signal levels in the angle spectrums (hereinafter referred to as "angle peak") corresponding to the reception signals of the reflection waves of the transmission waves.

The data processor 7 of the radar apparatus 1 derives a signal level difference between, for example, an angle peak corresponding to the reception signal of the transmission wave TW1 transmitted in the right-upward direction relative to the reference axis Ce and an angle peak corresponding to the reception signal of the transmission wave TW2 transmitted in the left-upward direction relative to the reference axis Ce.

The data processor 7 derives the actual angle of the actual position of the target based on: an angle of a pair data set based on the reception signal of the transmission wave TW1; an angle of a pair data set based on the reception signal of the transmission wave TW2; and the signal level difference between the angle peaks of those reception signals.

The data processor 7 derives the actual angle of the actual position of the target, based on table data that defines an actual angle of a target in association with, for example, two parameters of angle and signal level difference. The table data is stored in the memory 63 beforehand and is retrieved at a time of a process of deriving the angle.

Such a process is performed, for example, when the data processor 7 derives the angle of the target in the direction calculation process (the step S12). As a result, the radar apparatus 1 of this embodiment detects a target in a wider angle range and determines whether or not there is a phase holding.

2. Second Embodiment

Next, a second embodiment is explained. The first embodiment described above mainly explains the method of determining whether or not the target is the control-required target FO, based on the reflection waves that are the transmission waves TW1 to TW4 reflected by a target after being transmitted in order by the transmitting antenna 40. On the other hand, in the second embodiment, a radar apparatus 1a substantially simultaneously transmits transmission waves TW1, TW2, TW3 and TW4 from four transmitting antennas of transmitting antenna 40 in addition to the transmission waves TW1 to TW4 transmitted by the transmitting antenna 40 in order, like the radar apparatus 1 does in the first embodiment. A configuration and a process of the radar apparatus 1a in the second embodiment is substantially the same as the configuration and the process of the radar apparatus 1 in the first embodiment. A difference in the configuration and the process from the first embodiment is mainly described below.

2-1. System Block Diagram

Figure 7:
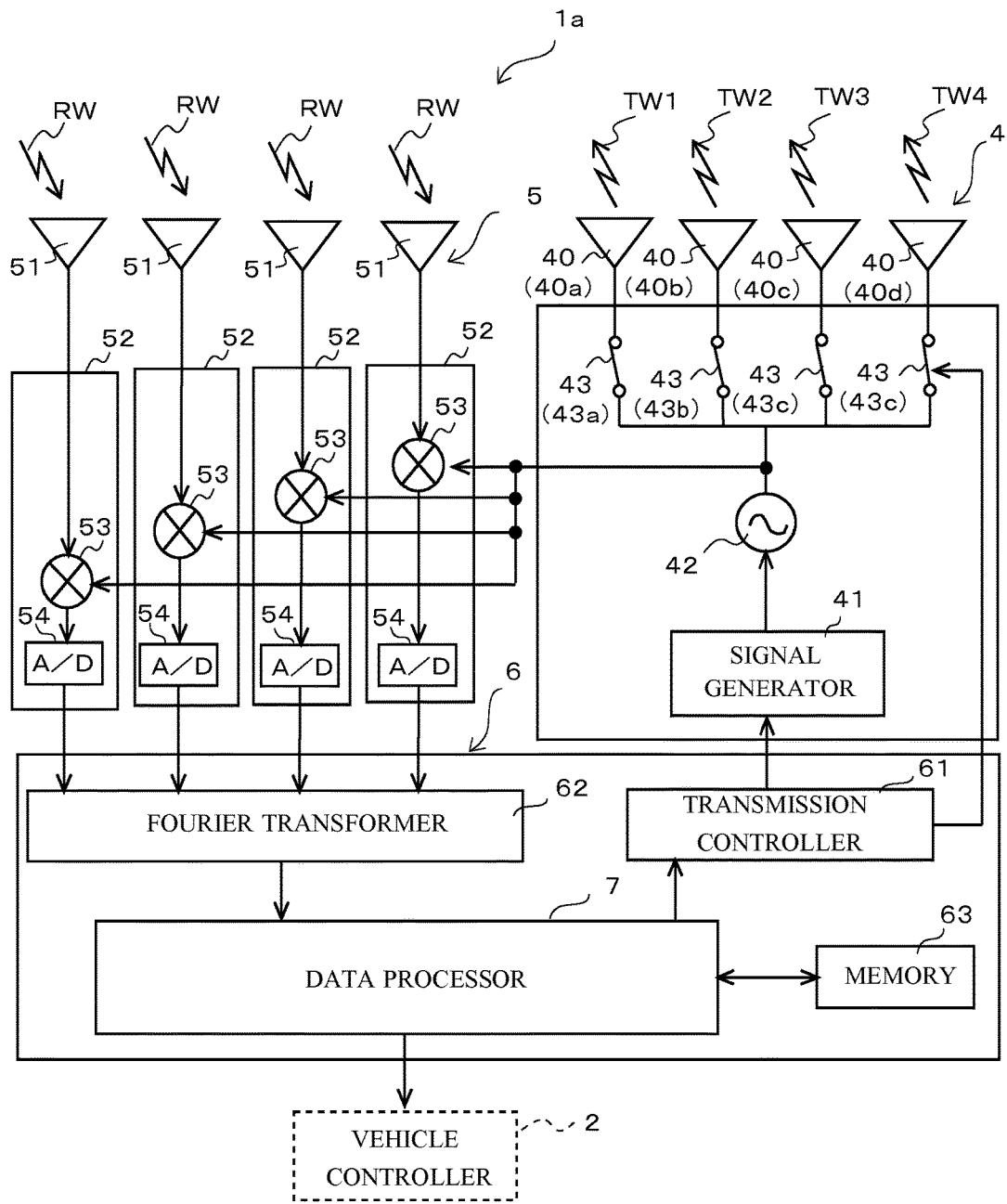
FIG. 7 illustrates a configuration of a radar apparatus in a second embodiment.

FIG. 7 illustrates the configuration of the radar apparatus 1a in the second embodiment. Switches 43 (43a, 43b, 43c and 43d) of the radar apparatus 1a are provided to transmitting antennas 40a, 40b, 40c and 40d, respectively. In a case where the transmission waves TW1 to TW4 are transmitted in order, one of the four switches 43a to 43d is turned on and connects an oscillator 42 to one of the antennas 40a to 40d of the transmitting antenna 40. In other words, three switches of the switches 43 are turned off and do not connect the other three antennas to the oscillator 42. In a case where the transmission waves TW1 to TW4 are substantially simultaneously transmitted, all of the switches 43a to 43d are turned on and connect all the transmitting antennas 40a to 40d of the transmitting antenna 40 to the oscillator 42.

2-2. Transmission Range

Figure 8A:
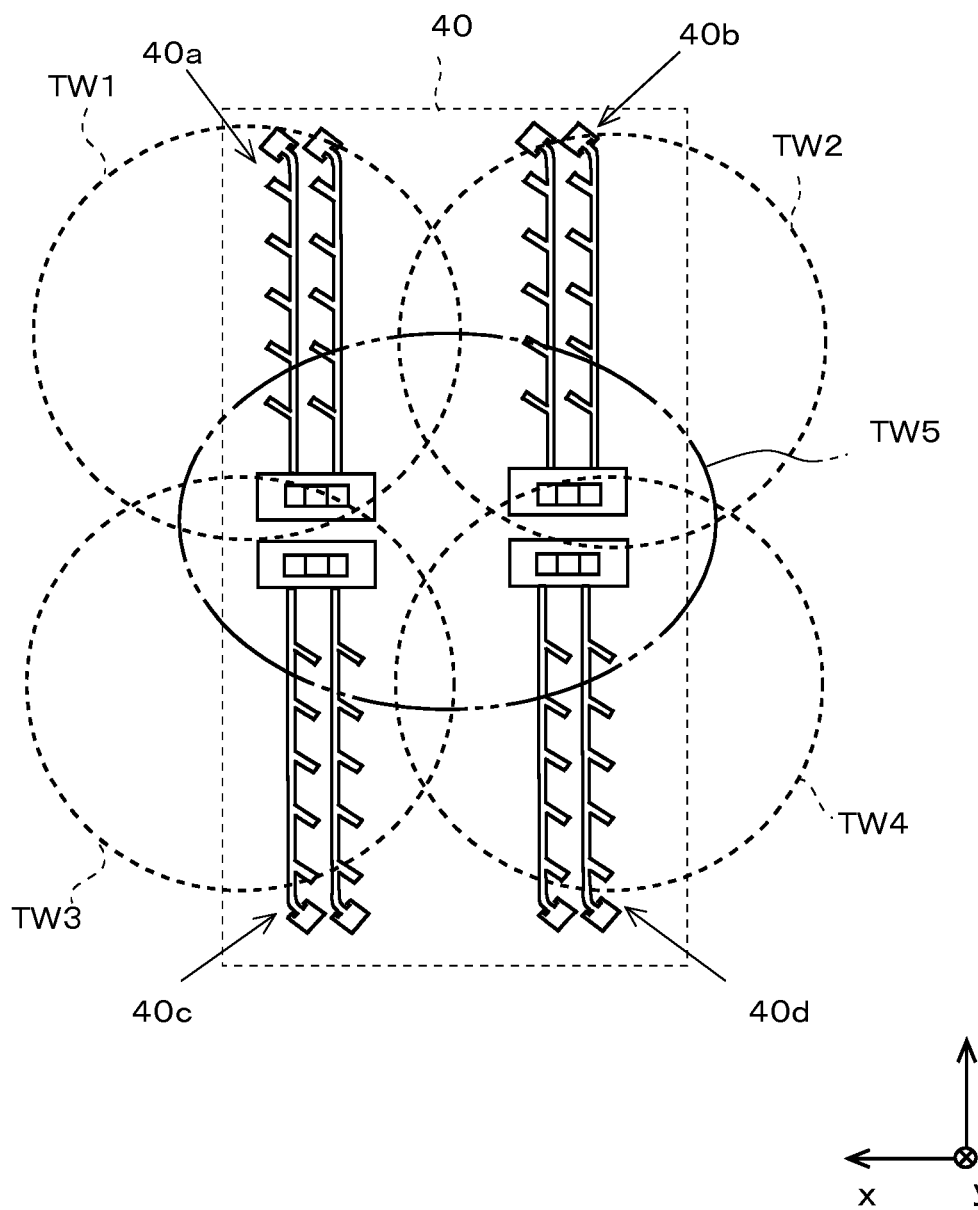
FIG. 8A illustrates a transmitting antenna viewed toward a rear side from a viewpoint located in front.

Next explained are transmission ranges of the transmission waves transmitted from the transmitting antenna 40 in the second embodiment. FIG. 8A illustrates the transmitting antenna 40 viewed toward a rear side of a host vehicle from a viewpoint located in front of the host vehicle. A combined wave TW5 transmitted by the transmitting antenna 40 is a transmission wave generated by transmitting the transmission waves TW1 to TW4 substantially simultaneously from the radar apparatus 1a. The transmitting antenna 40 transmits the transmission waves TW1 to TW4 in order and also transmits the combined wave TW5 having a predetermined transmission range by transmitting the transmission waves TW1 to TW4 substantially simultaneously in a traveling direction in which a host vehicle CR is traveling.

Figure 8B:
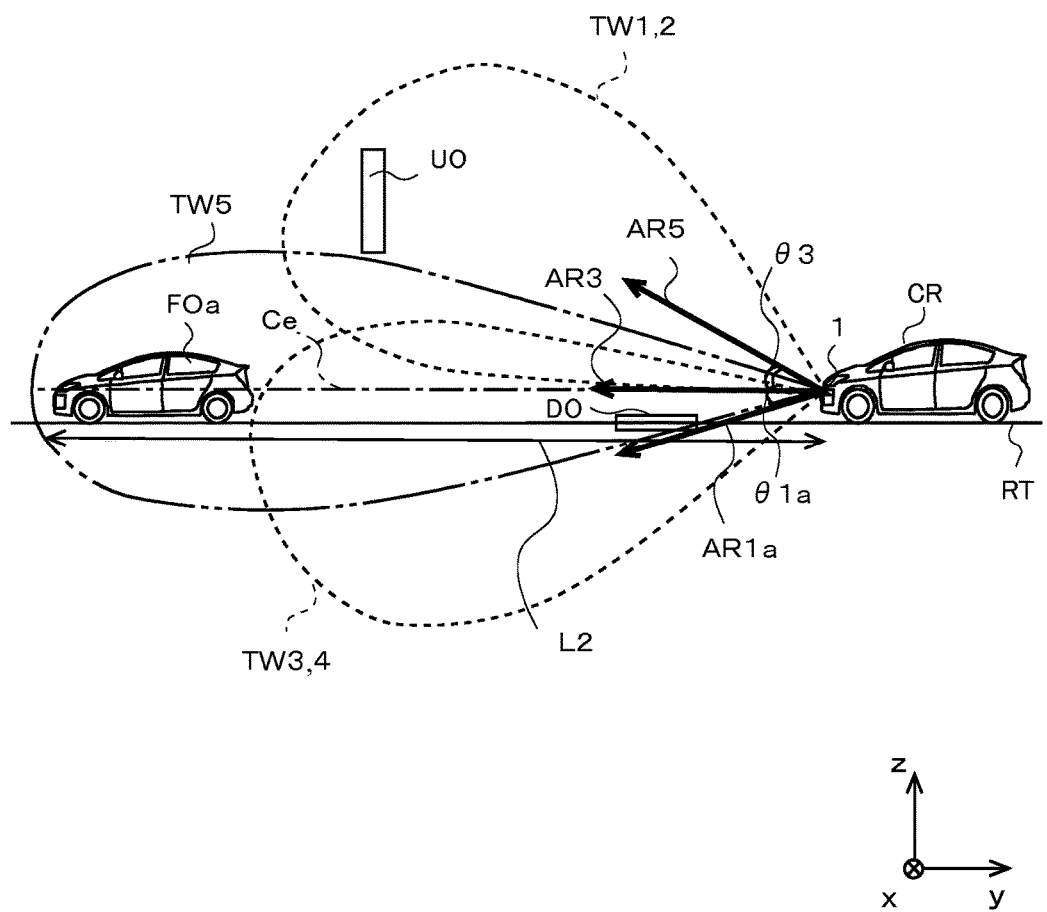
FIG. 8B illustrates a host vehicle viewed from a left side to a right side of the host vehicle.

FIG. 8B illustrates the host vehicle CR viewed from a left side to a right side of the host vehicle CR. The transmitting antenna 40 transmits the combined wave TW5 in a direction, shown by an arrow AR3, in which the reference axis Ce extends. In a case where a vertical angle of the reference axis Ce is ±0°, a vertical angle range of the combined wave TW5 is, for example, +3° in an upper direction and −3° in a lower direction. In other words, a maximum vertical angle range of the combined wave TW5 is 6°. The transmission range of the combined wave TW5 is narrower than the transmission ranges of the transmission waves TW1 to TW4 having a maximum vertical angle range of 12°.

A longitudinal distance L2 of the transmission range of the combined wave TW5 is longer than longitudinal distances L1 of the transmission ranges of the transmission waves TW1 to TW4. The longitudinal distance L1 of each of the transmission ranges of the transmission waves TW1 to TW4 is, for example, 60 m. On the other hand, the longitudinal distance L2 of the transmission range of the combined wave TW5 is, for example, 100 m because energy for transmission becomes greater due to the substantially simultaneous transmission of the transmission waves from the four transmitting antennas.

Figure 8C:
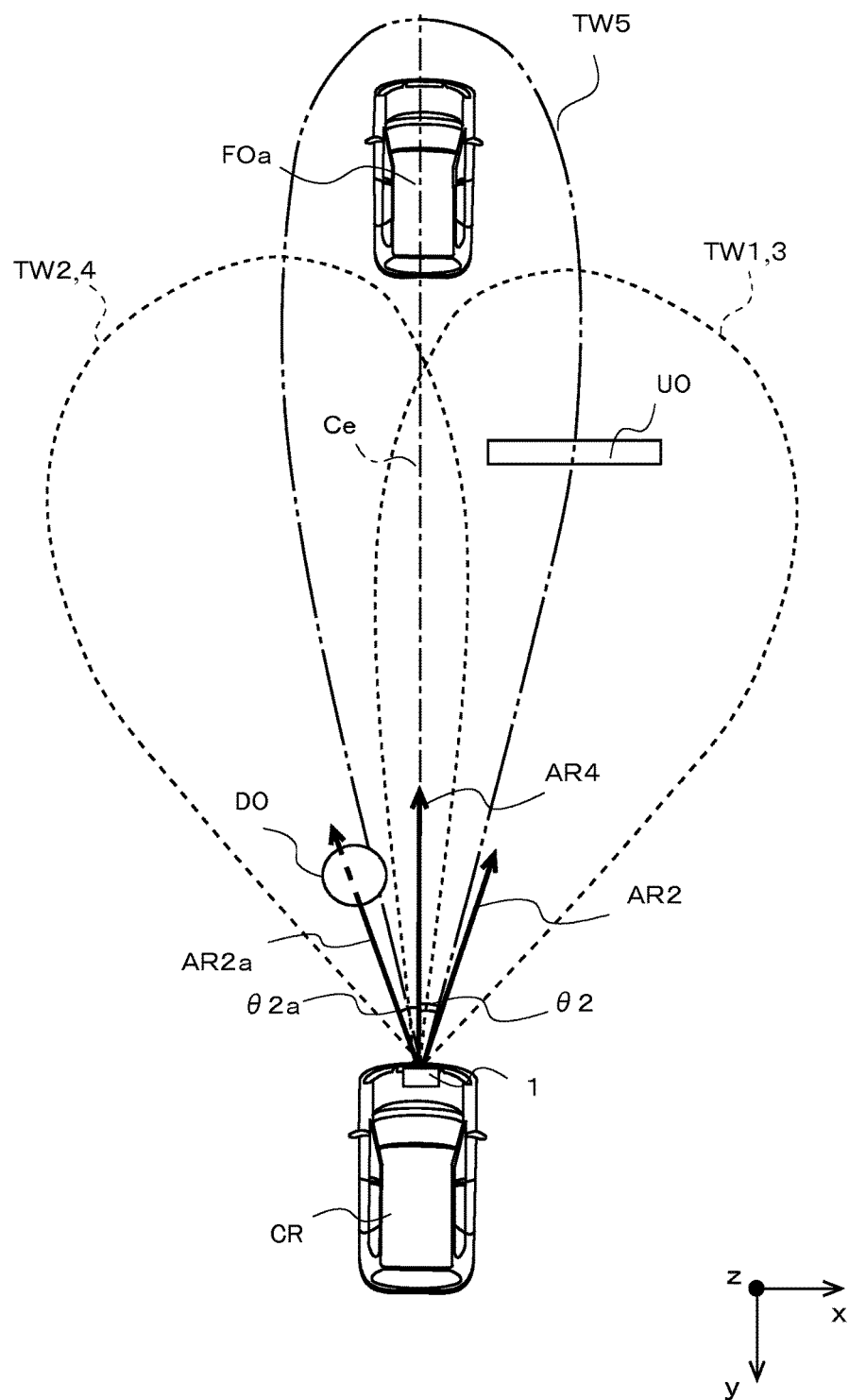
FIG. 8C illustrates the host vehicle viewed downward from a viewpoint located above the host vehicle.

FIG. 8C illustrates the host vehicle CR viewed downward from a viewpoint located above the host vehicle CR. The transmitting antenna 40 transmits the combined wave TW5 in a direction, shown by an arrow AR4, in which the reference axis Ce extends. Since the combined wave TW5 is transmitted in the direction shown by the arrow AR3 and the arrow AR4, the combined wave TW5 is transmitted, in other words, in the traveling direction in which the host vehicle CR is traveling. Moreover, the combined wave TW5 is transmitted, in other words, to a range near a front center of the host vehicle CR.

In a case where a horizontal angle of the reference axis Ce is ±0°, a horizontal angle range of the combined wave TW5 is, for example, +5° in a right direction and −5° in a left direction. In other words, a maximum horizontal angle range of the combined wave TW5 is 10°. The transmission range of the combined wave TW5 is narrower than the transmission ranges of the transmission waves TW1 to TW4 having a maximum horizontal angle range of 25°.

Although a control-required target FOa that exists a relatively long distance away from the host vehicle CR is not included in the transmission ranges of the transmission waves TW1 to TW4, the control-required target FOa is included in the transmission range of the combined wave TW5. Thus, the radar apparatus 1a is configured to derive target information of the control-required target FOa.

As described above, the radar apparatus 1a is configured to acquire the target information of the target existing a relatively long distance away from the host vehicle CR more certainly. Thus, a vehicle controller 2 performs more appropriate vehicle control based on the target information acquired from the radar apparatus 1a.

As described above, the control-required target FOa existing the relatively long distance away from the host vehicle CR can be included in the transmission range by substantially simultaneously transmitting the transmission waves TW1 to TW4. Therefore, the transmission waves TW1 and TW2 are transmitted from the transmitting antennas 40a and 40b in an upper direction shown by an arrow AR5 (e.g. +7°) than the direction shown by the arrow AR1 (e.g. +5°) in the first embodiment. Since the transmission waves transmitted in an obliquely upward direction are transmitted more upward, an upper target UO is more certainly included in the transmission ranges of the radar apparatus 1a. Then, the radar apparatus 1a certainly derives height information and the like of the upper target UO by receiving reflection waves directly from the upper target UO.

On the other hand, the transmission waves TW3 and TW4 transmitted in a downward direction are transmitted in a same direction as the direction shown by the arrow AR1a in the first embodiment. If the transmission waves TW3 and TW4 are transmitted lower than the direction shown by the arrow AR1a, a lower target DO is not included in the transmission ranges of the transmission waves TW3 and TW4. Therefore, as for the transmission waves that are transmitted in the downward direction, the radar apparatus 1a does not transmit the transmission waves lower than an angle of θ1a.

As described above, the transmission waves TW1 and TW2 are transmitted upper than the direction described in the first embodiment. Therefore, in the second embodiment, in a case where a target is the upper target UO or the lower target DO, height information of the target is derived by comparing reception levels between a first pair data set and a second pair data set. Then, whether or not the target is the control-required target FOa is determined based on a pair data set generated from the reception signal of the combined wave TW5 (hereinafter referred to as "third pair data set") and height information of the target is derived. In a case where a data processor 7 determines that the third pair data set is associated with none of targets with which the first pair data set and with the second pair data set are associated, the data processor 7 derives the height information representing that the third pair data set represents the control-required target FOa.

2-3. Transmission Timing of Transmission Waves

Figure 9:
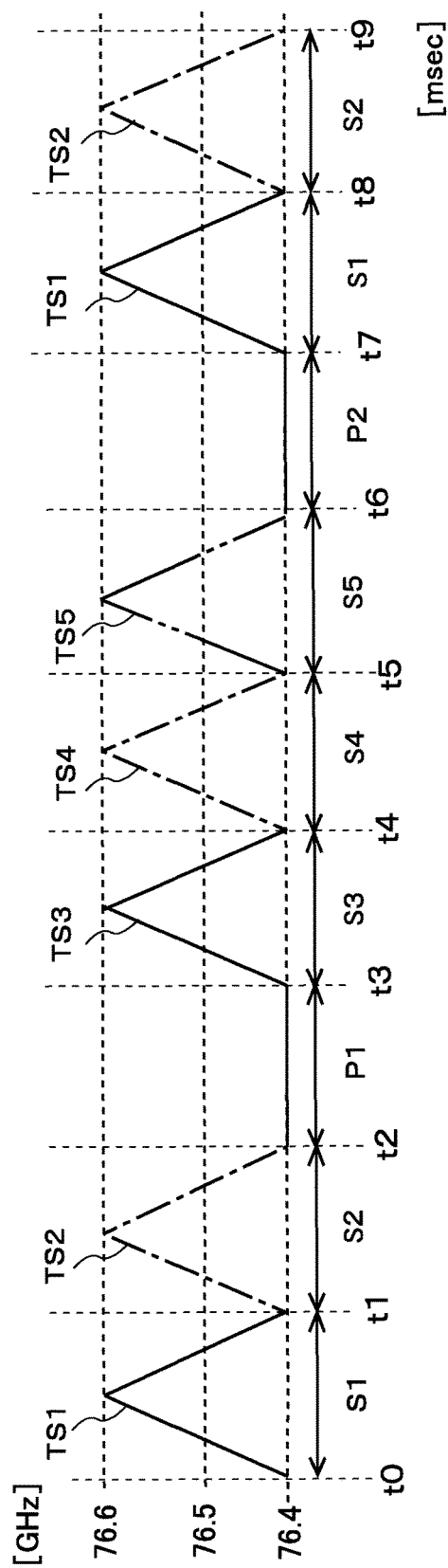
FIG. 9 illustrates timings when a transmitting antenna transmits transmission waves.

Next described are timings when the transmitting antenna 40 transmits the transmission waves in the second embodiment. FIG. 9 illustrates the timings when the transmitting antenna 40 transmits the transmission waves TW1 to TW5. In the second embodiment, the radar apparatus 1a transmits the transmission wave in a fifth transmission period S5 in addition to the first transmission period S1 to the fourth transmission period S4 in the first embodiment. In the fifth transmission period S5, a transmission signal TS5 is generated and the combined wave TW5 is transmitted. In other words, in the second embodiment, one cycle of a target deriving process is defined as a time period (a time point from t0 to a time point t7) that is a sum of a first transmission period S1 to the fifth transmission period S5 and a first processing period P1 to a second processing period P2 and the cycle is repeated. Thus, the transmission waves TW1 to TW4 corresponding to the transmission signals TS1 to TS4 are transmitted in order and then the combined wave TW5 corresponding to the transmission signal TS5 is transmitted. Accordingly, the radar apparatus 1a derives the target information of targets including the control-required target FOa existing the relatively long distance away from the host vehicle CR.

As described above, in the second embodiment, the radar apparatus 1a transmits the transmission waves TW1 to TW4 from the transmitting antennas 40a to 40d of the transmitting antenna 40, respectively, in order and transmits the combined wave TW5 in the traveling direction of the host vehicle CR by transmitting the transmission waves TW1 to TW4 substantially simultaneously from the four transmitting antennas 40a to 40d. Thus, a relatively long range in the traveling direction of the host vehicle CR is included in the transmission ranges of the radar apparatus 1a, and thus the target information of the control-required target FOa can be derived early. Moreover, since the angles at which the transmission waves TW1 and TW2 are transmitted relative to the reference axis Ce can be greater, the reflection waves directly reflected from the upper target UO can be certainly received and accurate target information can be derived. Since the angles of the transmission waves TW1 and TW2 are greater, a region in the traveling direction of the host vehicle CR in which the control-required target FOa possibly exists becomes out of the transmission ranges. However, the region is included in the transmission range of the combined wave TW5.

3. Third Embodiment

Next, a third embodiment is described. The second embodiment described above mainly explains that the transmitting antennas of the transmitting antenna 40 transmit the transmission waves TW1, TW2, TW3 and TW4, respectively, in order and also the transmitting antenna 40 transmits the combined wave TW5 by transmitting the transmission waves substantially simultaneously from the four transmitting antennas. On the other hand, in the third embodiment, in addition to the transmission method described in the second embodiment, a radar apparatus 1a pairs two of four transmitting antennas and transmits transmission waves from the paired transmitting antennas substantially simultaneously. Concretely, a transmitting antenna 40a and a transmitting antenna 40b are paired as a first antenna pair, and the transmitting antennas 40a and 40b substantially simultaneously transmit a transmission wave TW1 and a transmission wave TW2. A transmitting antenna 40c and a transmitting antenna 40d are paired as a second antenna pair, and the transmitting antennas 40c and 40d substantially simultaneously transmit a transmission wave TW3 and a transmission wave TW4. A configuration and a process of the radar apparatus 1a in the third embodiment is substantially the same as the configuration and the process of the radar apparatus 1a in the second embodiment. A difference in the configuration and the process from the second embodiment is mainly described below.

3-1. Transmission Range

Figure 10A:
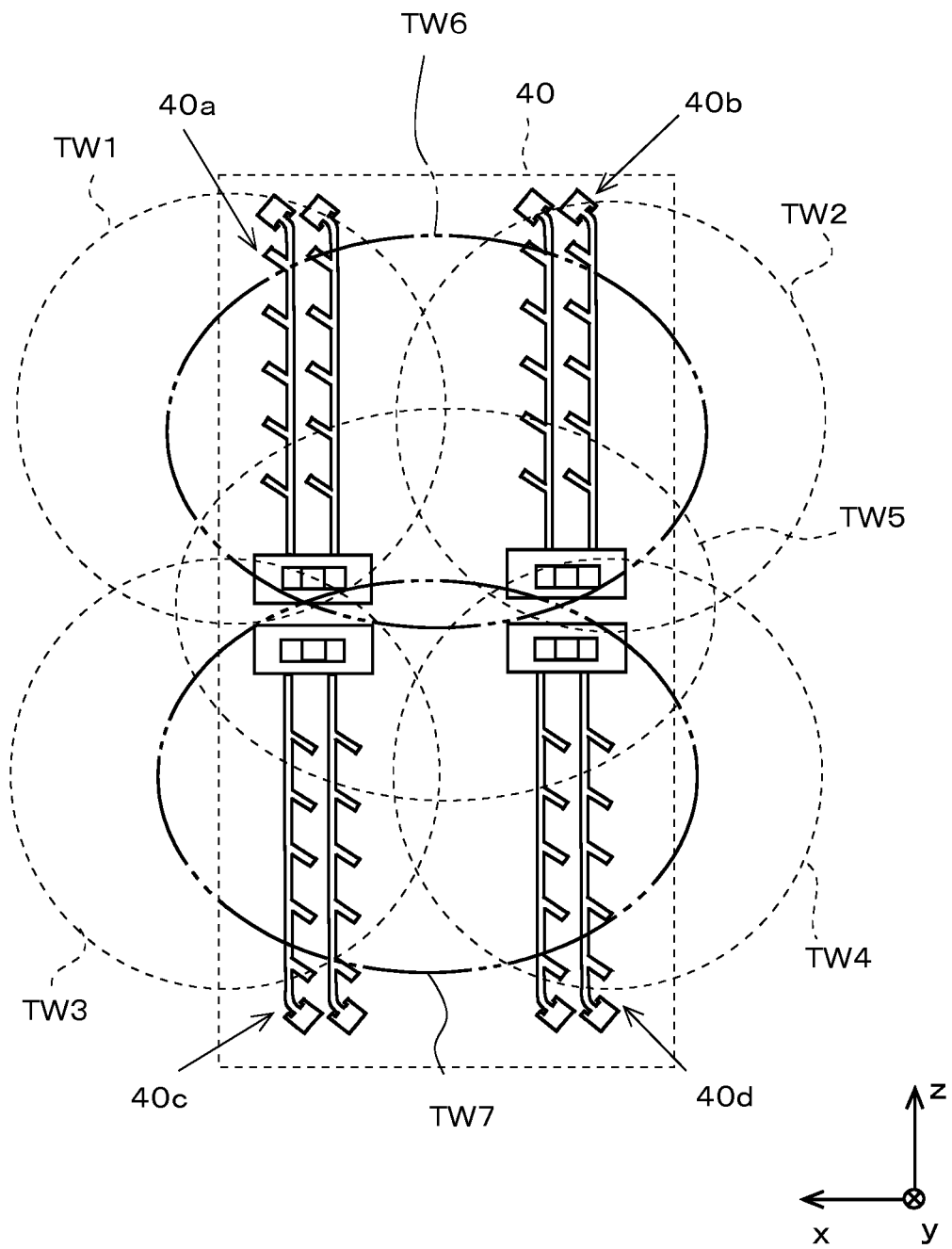
FIG. 10A illustrates a transmitting antenna viewed toward a rear side from a viewpoint located in front.

First explained are transmission ranges of the transmission waves of the transmitting antenna 40 in the third embodiment. FIG. 10A illustrates the transmitting antenna 40 viewed toward a rear side of a host vehicle from a viewpoint located in front of the host vehicle. A combined wave TW6 transmitted from the transmitting antenna 40 is generated by transmitting the transmission waves TW1 and TW2 from the antennas of the first antenna pair (hereinafter referred to as "first paired antennas") substantially simultaneously. A combined wave TW7 transmitted from the transmitting antenna 40 is generated by transmitting the transmission waves TW3 and TW4 from the antennas of the second antenna pair (hereinafter referred to as "second paired antennas") substantially simultaneously.

The transmitting antenna 40 transmits the transmission waves TW1 to TW4 in order from transmitting antennas, respectively, and also transmits the transmission waves TW1 to TW4 substantially simultaneously. Then, the first paired antennas transmit the combined wave TW6 having a predetermined transmission range at a first predetermined transmission timing by transmitting the transmission waves TW1 and TW2 substantially simultaneously. Moreover, the second paired antennas transmit the combined wave TW7 having a predetermined transmission range at a second transmission timing that is different from the first predetermined transmission timing, by transmitting the transmission waves TW3 and TW4 substantially simultaneously.

Figure 10B:
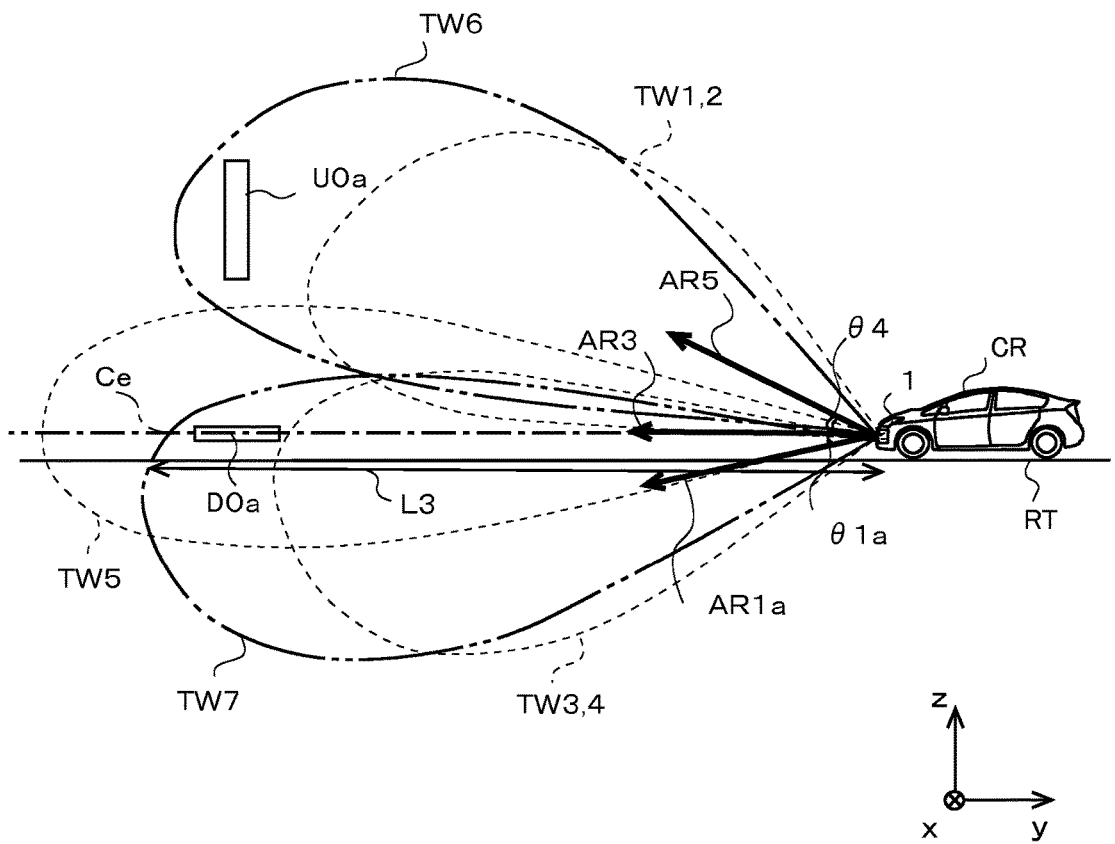
FIG. 10B illustrates a host vehicle viewed from a left side to a right side of the host vehicle.

FIG. 10B illustrates a host vehicle CR viewed from a left side to a right side of the host vehicle CR. The first paired antennas transmit the combined wave TW6 in a direction shown by an arrow AR5. The second paired antennas transmit the combined wave TW7 in a direction shown by an arrow AR1a. Entire vertical angle ranges of the combined waves TW6 and TW7 are, for example, 8° relative to a reference axis Ce. A transmission range of the combined wave TW6 having the entire vertical angle range of 8° is narrower than transmission ranges of the transmission waves TW1 to TW4 having an entire vertical angle range of 12°. Moreover, longitudinal distances L3 of the combined wave TW6 and the combined wave TW7 are greater than longitudinal distances L1 of the transmission waves TW1 to TW4. Each of the longitudinal distances L1 is, for example, 60 m. On the other hand, each of the longitudinal distances L3 is, for example, 80 m.

Figure 10C:
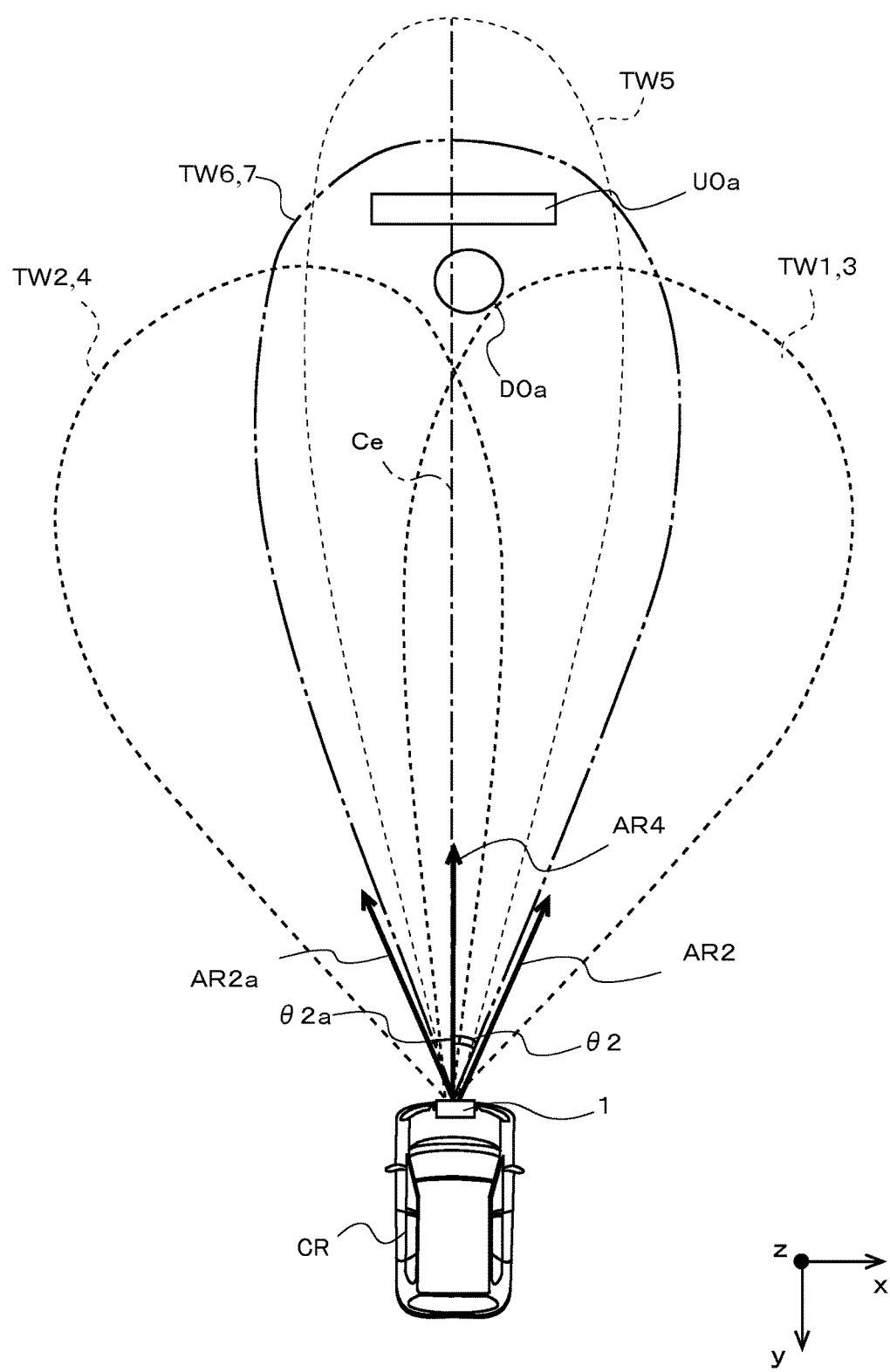
FIG. 10C illustrates the host vehicle viewed downward from a viewpoint located above the host vehicle.

FIG. 10C illustrates the host vehicle CR viewed downward from a viewpoint located above the host vehicle CR.

The first paired antennas transmit the combined wave TW6 in a direction shown by an arrow AR4 in which the reference axis Ce extends. The second paired antennas transmit the combined wave TW7 in a direction shown by an arrow AR4 same as the direction in which the combined wave TW6 is transmitted.

In a case where a horizontal angle of the reference axis Ce is ±0°, horizontal angle ranges of the combined wave TW6 and the combined wave TW7 are, for example, +8° in a right direction and −8° in a left direction. In other words, maximum horizontal angle ranges of the combined waves TW6 and TW7 are 16°. Therefore, the transmission ranges of the combined waves TW6 and TW7 are narrower than the transmission ranges of the transmission waves TW1 to TW4 having a maximum horizontal angle range of 25°.

3-2. Transmission Timing of Transmission Waves

Figure 11:
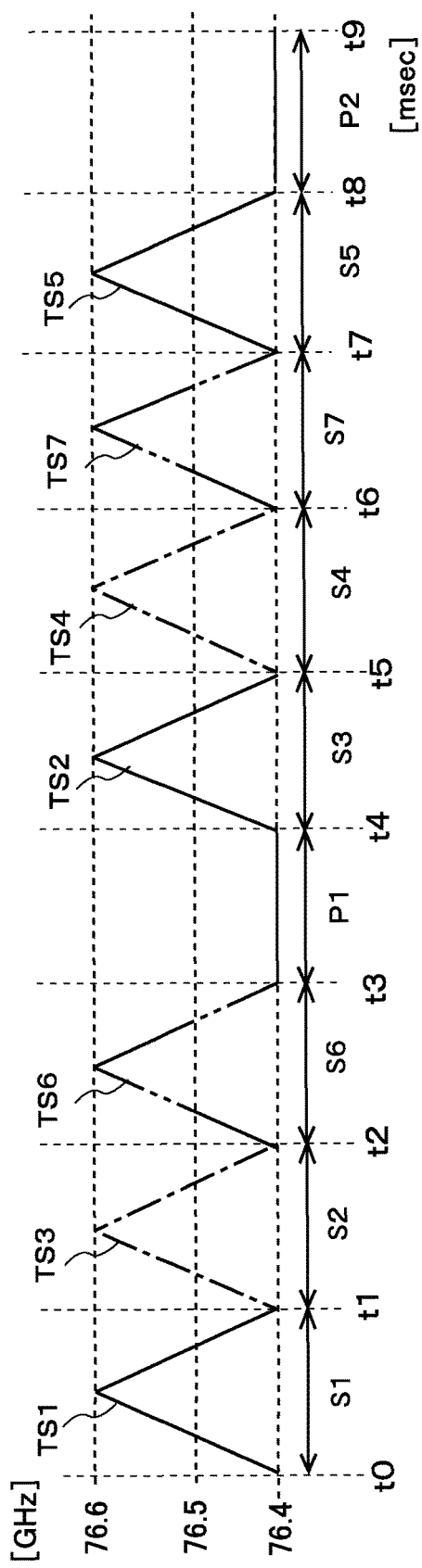
FIG. 11 illustrates timings when a transmitting antenna transmits transmission waves.

Next described are timings when the transmitting antenna 40 transmits the transmission waves in the third embodiment. FIG. 11 illustrates the timings when the transmitting antenna 40 transmits the transmission waves TW1 to TW7. In the third embodiment, the radar apparatus 1a transmits the transmission wave in a sixth transmission period S6 (from a time point t2 to a time point t3) and also transmits the transmission wave in a seventh transmission period S7 (from a time point t6 to a time point t7) in addition to the first transmission period S1 to the fifth transmission period S5 in the second embodiment.

In the sixth transmission period S6, a transmission signal TS6 is generated and the combined wave TW6 is transmitted. In the seventh transmission period S7, a transmission signal TS7 is generated and the combined wave TW7 is transmitted. In other words, in the third embodiment, one cycle of a target deriving process is defined as a time period (from a time point t0 to the time point t9) that is a sum of a first transmission period S1 to the seventh transmission period S7 and a first processing period P1 to a second processing period P2, and the cycle is repeated. Thus, the transmission waves TW1 to TW4 corresponding to the transmission signals TS1 to TS4 are transmitted in order and the combined wave TW5 corresponding to the transmission signal TS5, the combined wave TW6 corresponding to the transmission signal TS6 and the combined wave TW7 corresponding to the transmission signal TS7 are transmitted. Accordingly, the radar apparatus 1a derives target information of targets located in different positions in a vertical direction relative to the reference axis Ce.

As described above, in the third embodiment, the radar apparatus 1a transmits the transmission waves in order from the individual transmitting antennas of the transmitting antenna 40 and transmits the combined wave TW5 by transmitting the transmission waves substantially simultaneously from the four transmitting antennas of the transmitting antenna 40. Then, the radar apparatus 1a transmits the combined wave TW6 from the first paired antennas at the first transmission timing and transmits the combined wave TW7 from the second paired antennas at the second transmission timing. Thus, relatively long ranges extended in an obliquely upward direction and in an obliquely downward direction relative to the host vehicle CR are included in the transmission ranges of the radar apparatus 1a and target information of an upper target UOa and a lower target DOa can be early derived.

Fourth Embodiment

Next, a fourth embodiment is described. The second embodiment described above mainly explains that the transmitting antennas of the transmitting antenna 40 transmit the transmission waves TW1, TW2, TW3 and TW4, respectively, in order and also the transmitting antenna 40 transmits the combined wave TW5 by transmitting the transmission waves substantially simultaneously from the four transmitting antennas. In the fourth embodiment, when four transmitting antennas transmit transmission waves substantially simultaneously, phases of transmission signals are adjusted such that a combined wave is transmitted in a traveling direction of a host vehicle CR and in a direction different from the traveling direction of the host vehicle CR. The different direction is at least one of an obliquely upward direction and an obliquely downward direction. A configuration and a process of a radar apparatus 1b in the fourth embodiment is substantially the same as the configuration and the process of the radar apparatus 1a in the second embodiment. A difference in the configuration and the process from the second embodiment is mainly described below.

4-1. System Block Diagram

Figure 12:
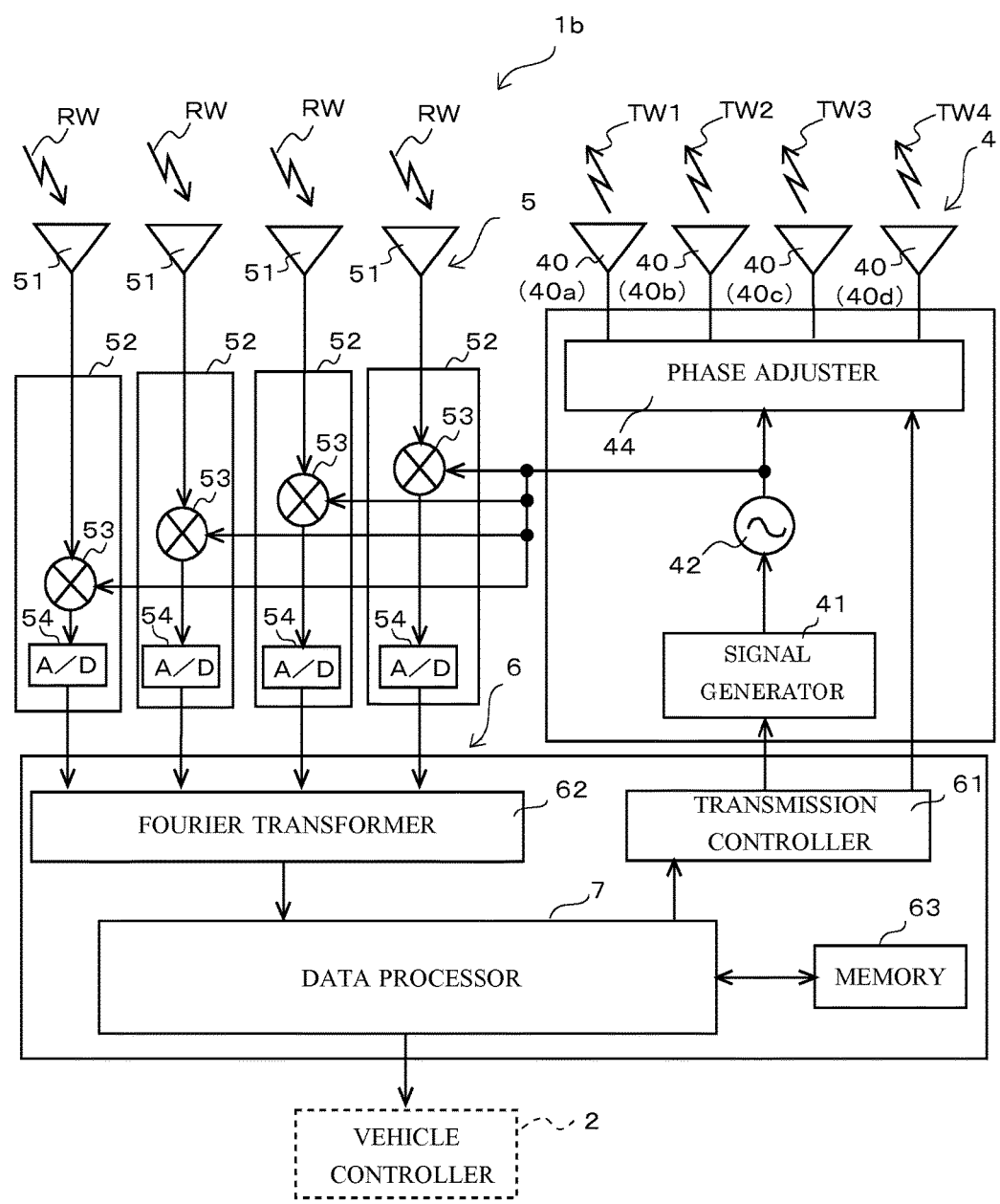
FIG. 12 illustrates a configuration of a radar apparatus in a fourth embodiment.

FIG. 12 illustrates the configuration of the radar apparatus 1b in the fourth embodiment. The radar apparatus 1b includes a phase adjuster 44, instead of the switches 43 (switch 43a to 43d) in the second embodiment. The phase adjuster 44 adjusts, based on a command signal relating to phase adjustment from a transmission controller 61, phases of transmission signals supplied to the transmitting antenna 40.

Figure 13:
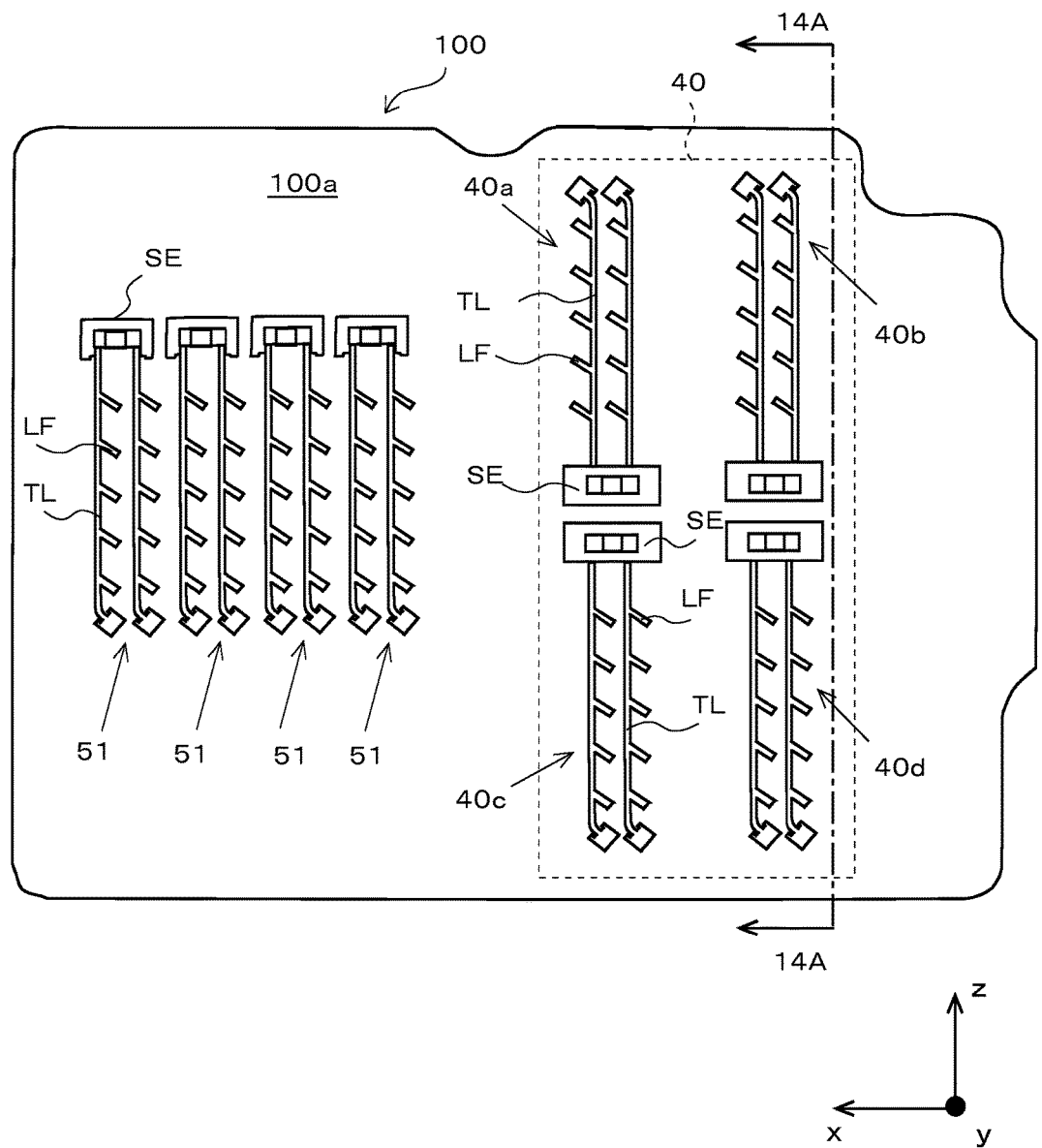
FIG. 13 illustrates a configuration of an antenna described in the first embodiment.
Figure 14A:
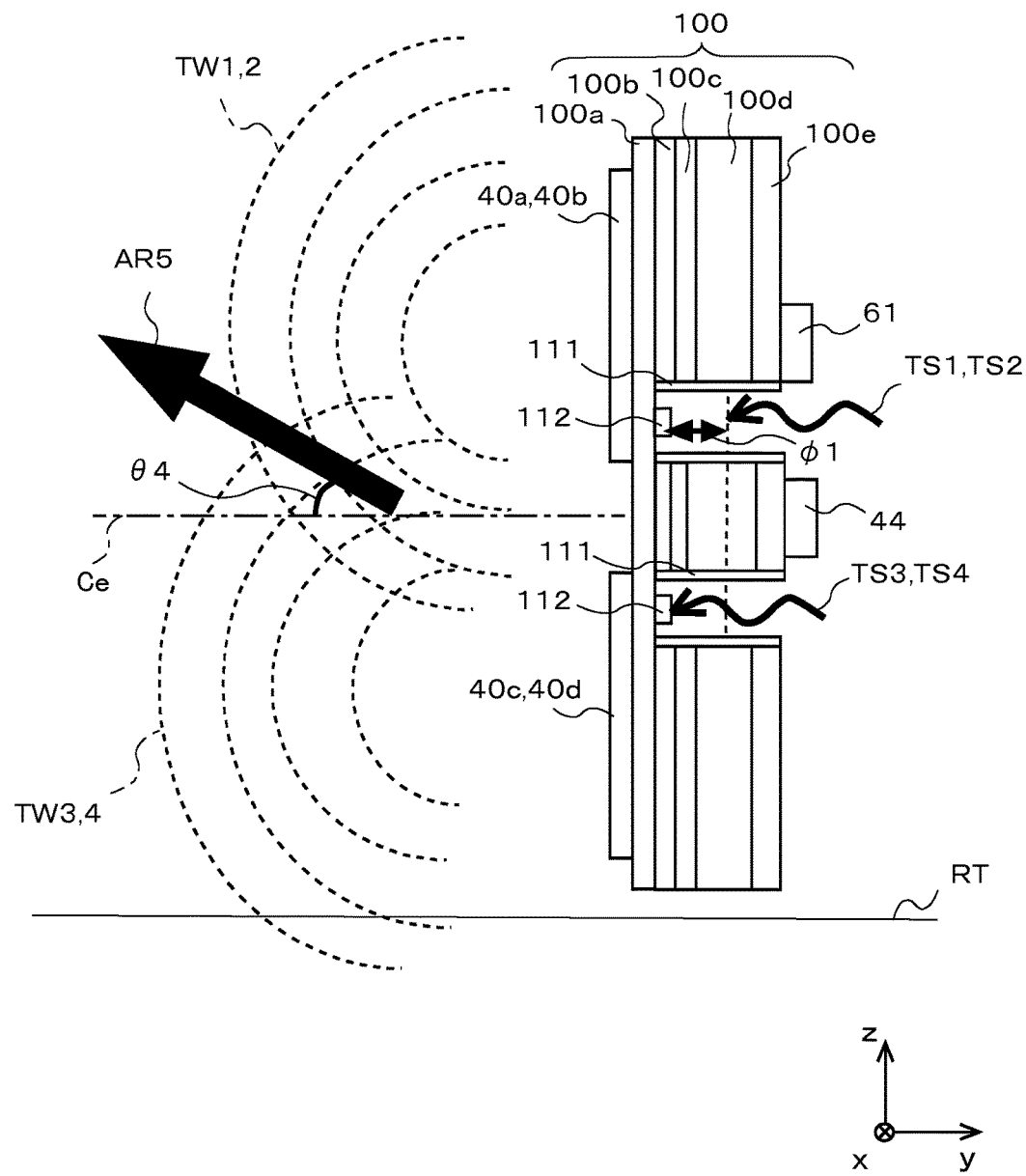
FIG. 14A is a cross-sectional diagram of an antenna.

The phase adjustment of the transmission signals is explained with reference to FIG. 13 and FIG. 14. FIG. 13 illustrates a configuration of an antenna 100 that is the same as the antenna 100 in FIG. 4 in the first embodiment. Each of FIG. 14A and FIG. 14B is a cross-sectional diagram of the antenna 100 along the line 14A-14A. First, a configuration of a cross-section of the antenna 100 is briefly explained. As shown in FIG. 14A and FIG. 14B, transmitting antennas 40a, 40b, 40c and 40d are provided to a surface of a dielectric substrate 100a. A ground layer 100b is provided to a back surface of the antenna 100. An antenna housing 100d is provided to a back surface of the ground layer 100b via an adhesion layer 100c. The antenna housing 100d is a member that functions as a chassis of the antenna 100. The transmission controller 61 and the phase adjuster 44 are provided on a resin substrate 100e.

Transmission signals TS1, TS2, TS3 and TS4 are delivered to a driven element 112 via a waveguide 111 that is a signaling pathway for the transmission signals. The driven element 112 is a member that supplies the transmission signals to the transmitting antenna 40. As shown in FIG. 14A, the phase adjuster 44 adjusts phases of the transmission signals TS1 to TS4. Thus, before the adjustment, a combined wave generated by transmitting transmission waves TW1 to TW4 substantially simultaneously is transmitted in a direction in which a reference axis Ce extends. After the adjustment, the combined wave is transmitted in a direction shown by an arrow AR5. The direction shown by the arrow AR5 is an obliquely upward direction relative to the reference axis Ce. Based on the command signal relating to the phase adjustment from the transmission controller 61, the phase adjuster 44 adjusts the phases of the transmission signals TS1 and TS2 such that the phases thereof are $\phi 1°$ behind the phases of the transmission signals TS3 and TS4. Thus, the combined wave is transmitted in the obliquely upward direction relative to the reference axis Ce.

As described above, since the transmission signals TS1 and TS2 are delivered to the driven element 112 $\phi 1°$ behind the phases of the transmission signals TS3 and TS4, first paired antennas and second paired antennas transmit the transmission waves of which the phases are different from each other. Then the combined wave generated from the transmission waves is transmitted in the direction shown by the arrow AR5. Concretely, in a case where an angle of the reference axis Ce is ±0°, the combined wave is transmitted in a direction at $\theta 4°$ (e.g., +5°).

Figure 14B:
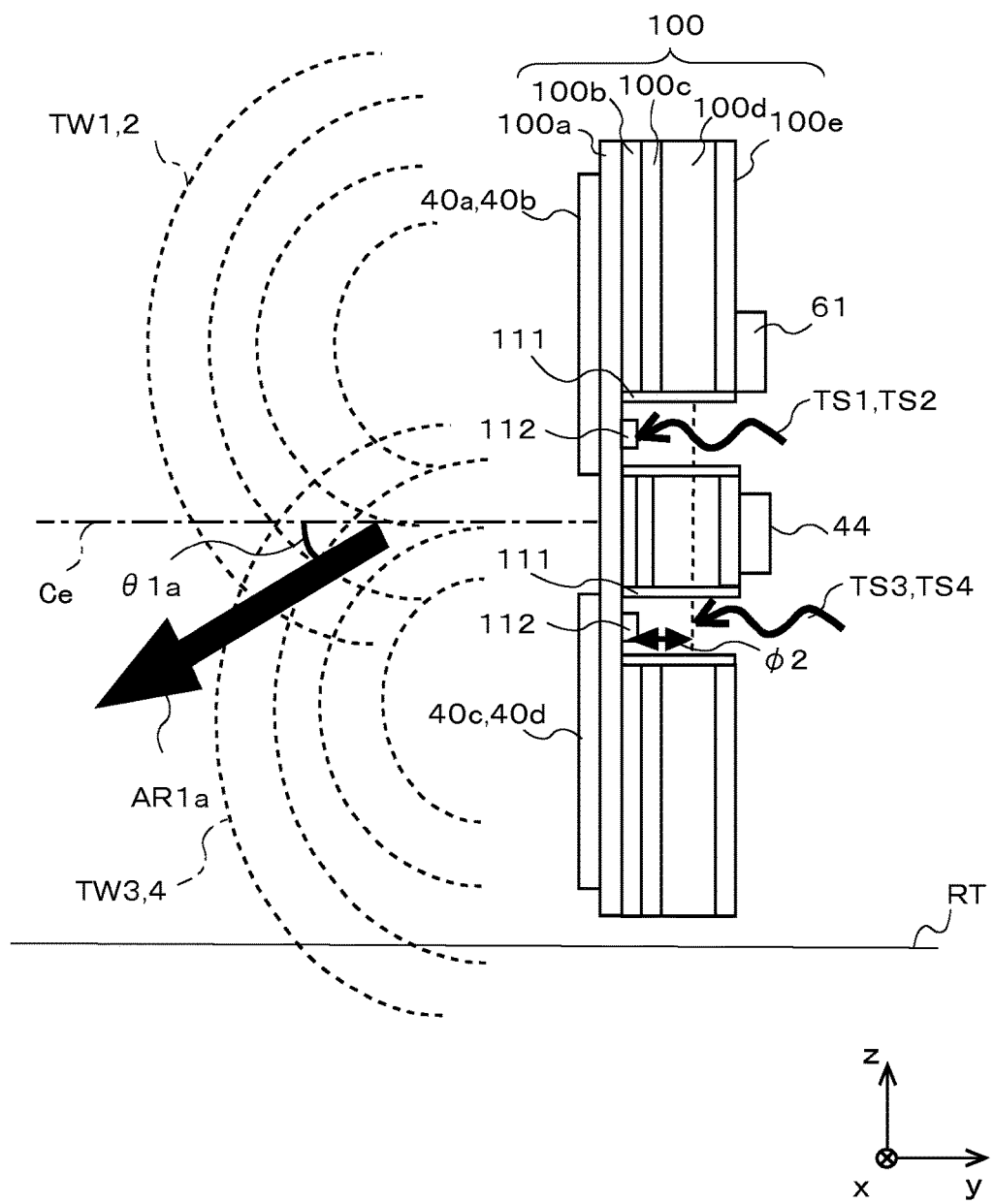
FIG. 14B is a cross-sectional diagram of the antenna.

As shown in FIG. 14B, the phase adjuster 44 adjusts the phases of the transmission signals TS1 to TS4. Thus, before the adjustment, the combined wave generated by transmitting the transmission waves TW1 to TW4 substantially simultaneously is transmitted in the direction in which the reference axis Ce extends. After the adjustment, the combined wave is transmitted in a direction shown by an arrow AR1a. The direction shown by the arrow AR1a is an obliquely downward direction relative to the reference axis Ce.

Based on the command signal relating to the phase adjustment from the transmission controller 61, the phase adjuster 44 adjusts the phases of the transmission signals TS3 and TS4 such that the phases of the transmission signals TS3 and TS4 are $\phi 2°$ behind the phases of the transmission signals TS1 and TS2. Thus, the combined wave is transmitted in the obliquely downward direction relative to the reference axis Ce.

As described above, since the transmission signals TS3 and TS4 are delivered to the driven element 112 $\phi 2°$ behind the phases of the transmission signals TS1 and TS2, the first paired antennas and the second paired antennas transmit the transmission waves of which the phases are different from each other. Then the combined wave generated from the transmission waves is transmitted in the direction shown by the arrow AR1a. Concretely, in a case where the angle of the reference axis Ce is ±0°, the combined wave is transmitted in a direction at $\theta 1a°$ (e.g., −5°).

4-2. Transmission Range

Figure 15A:
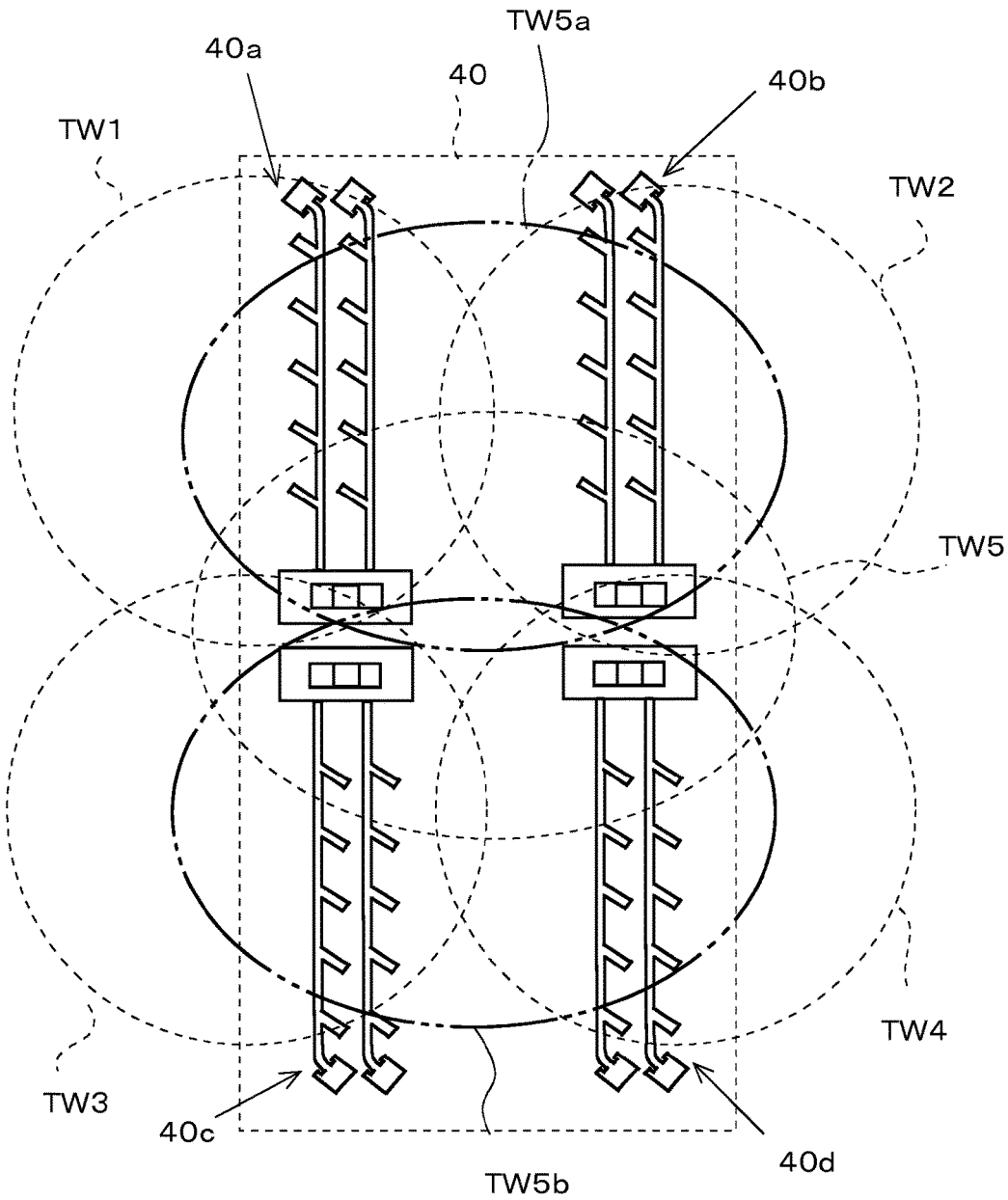
FIG. 15A illustrates a transmitting antenna viewed toward a rear side from a viewpoint located in front.

Next explained are transmission ranges of the transmission waves of the transmitting antenna 40 in the fourth embodiment. FIG. 15A illustrates the transmitting antenna 40 viewed toward a rear side of the host vehicle CR from a viewpoint located in front of the host vehicle CR. A combined wave TW5a and a combined wave TW5b are generated by adjusting the phases of the transmission waves substantially simultaneously transmitted from the four transmitting antennas of the transmitting antenna 40. The phases of the transmission waves are adjusted by the phase adjuster 44.

The transmitting antenna 40 transmits the transmission waves TW1 to TW4 in order from the individual transmitting antennas and also transmits the transmission waves TW1 to TW4 substantially simultaneously. The phase adjuster 44 adjusts the phases of the transmission signals TS1 and TS2 at a predetermined timing (e.g. a third transmission timing) in which the four transmitting antennas transmit the transmission waves substantially simultaneously such that the phases thereof are behind the phases of the transmission signals TS3 and TS4. Thus, the radar apparatus 1b transmits the combined wave TW5a in the obliquely upward direction relative to the reference axis Ce over a relatively long distance.

The phase adjuster 44 adjusts the phases of the transmission signals TS3 and TS4 at a predetermined timing immediately after the third transmission timing (e.g. a fourth transmission timing) such that the phases thereof are behind the phases of the transmission signals TS1 and TS2. Thus, the radar apparatus 1b transmits the combined wave TW5b in the obliquely downward direction relative to the reference axis Ce over a relatively long distance.

Figure 15B:
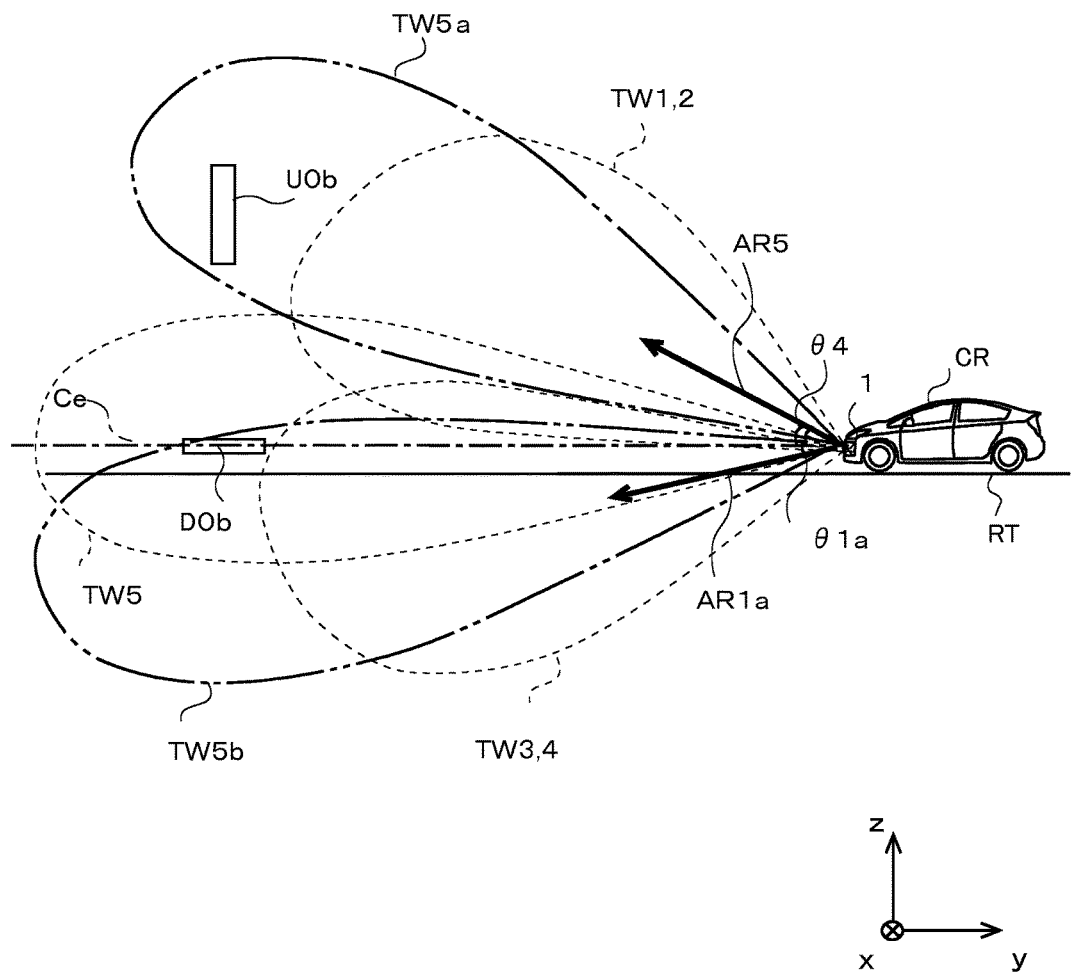
FIG. 15B illustrates a host vehicle viewed from a left side to a right side of the host vehicle.

FIG. 15B illustrates the host vehicle CR viewed from a left side to a right side of the host vehicle CR. The four transmitting antennas of the transmitting antenna 40 transmit the combined wave TW5a of which the phase is adjusted, in the direction shown by the arrow AR5. The direction shown by the arrow AR5 is a direction obliquely upper than the reference axis Ce and is a direction in which the transmission waves TW1 and TW2 are transmitted. Moreover, the four transmitting antennas of the transmitting antenna 40 transmit the combined wave TW5b of which the phase is adjusted, in the direction shown by the arrow AR1a. The direction shown by the arrow AR1a is a direction obliquely lower than the reference axis Ce and is a direction in which the transmission waves TW3 and TW4 are transmitted.

Maximum vertical angle ranges of the combined waves TW5a and TW5b are 6°. Therefore, the transmission ranges of the combined waves TW5a and TW5b are narrower than the transmission ranges of the transmission waves TW1 to TW4 having a maximum vertical angle range of 12°.

Longitudinal distances of the combined waves TW5a and TW5b are greater than longitudinal distances L1 of the transmission waves TW1 to TW4. Each of the longitudinal distance L1 is, for example, 60 m. On the other hand, each of the longitudinal distances of the combined waves TW5a and TW5b is, for example, 100 m.

Figure 15C:
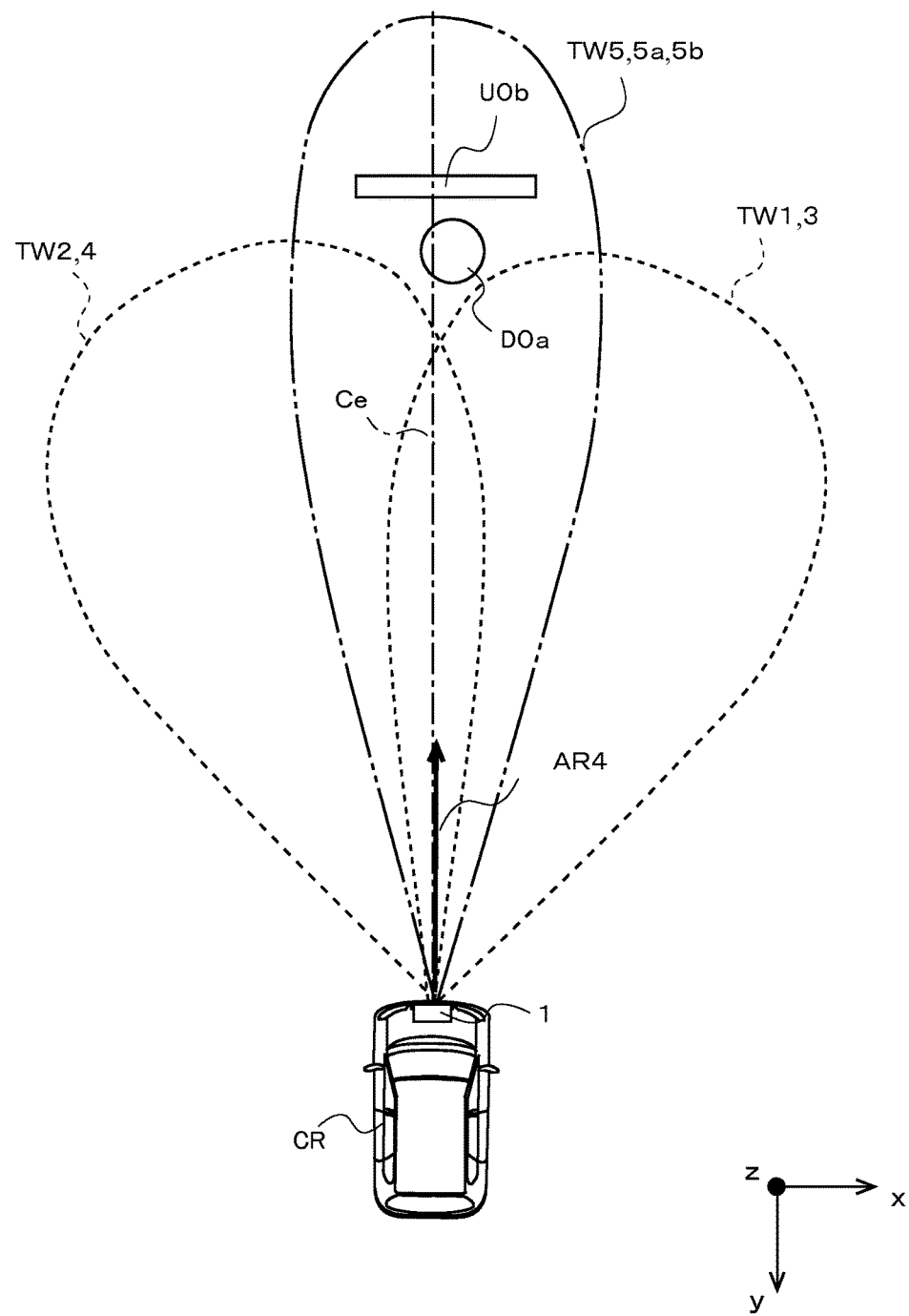
FIG. 15C illustrates the host vehicle viewed downward from a viewpoint located above the host vehicle.

FIG. 15C illustrates the host vehicle CR viewed downward from a viewpoint located above the host vehicle CR. The four transmitting antennas of the transmitting antenna 40 transmit the combined waves TW5a and TW5b in a direction shown by an arrow AR4. The reference axis Ce extends in the direction shown by the arrow AR4. Maximum horizontal angle ranges of the combined waves TW5a and TW5b are, for example, 10°. Therefore, the transmission ranges of the combined waves TW5a and TW5b are narrower than the transmission ranges of the transmission waves TW1 to TW4 having a maximum horizontal angle range of 25°.

Thus, the radar apparatus 1b includes an upper target and/or a lower target, such as an upper target UOb and a lower target DOb, in at least one of the transmission ranges of the combined waves TW5a and TW5b although the upper target and/or the lower target are not included in the transmission ranges of the transmission waves TW1 to TW4 due to existing in relatively long distances away from the host vehicle CR. Thus, the radar apparatus 1b derives target information of the target in the relatively long distance away. Moreover, appropriate vehicle control can be performed by the vehicle controller 2 based on the target information acquired from the radar apparatus 1b.

4-3. Transmission Timing of Transmission Waves

Figure 16:
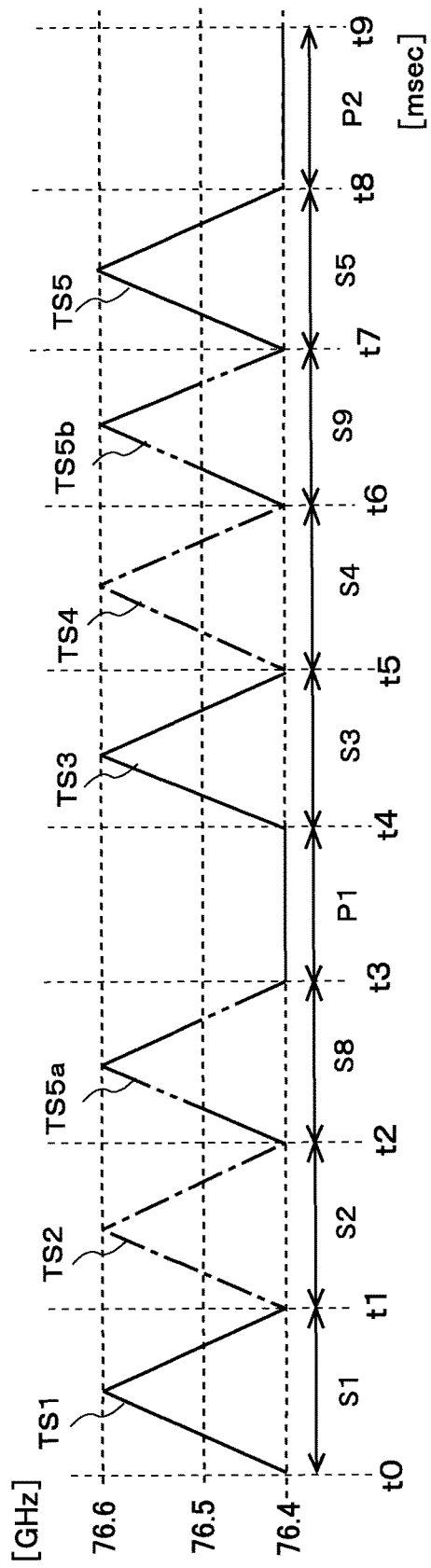
FIG. 16 illustrates timings when a transmitting antenna transmits transmission waves.

Next described are timings when the transmitting antenna 40 transmits the transmission waves in the fourth embodiment. FIG. 16 illustrates the timings when the transmitting antenna 40 transmits the transmission waves. In the fourth embodiment, the radar apparatus 1b transmits the transmission wave in an eighth transmission period S8 (from a time point t2 to a time point t3) and also transmits the transmission wave in a ninth transmission period S9 (from a time point t6 to a time point t7) in addition to the first transmission period S1 to the fifth transmission period S5 in the second embodiment. In the eighth transmission period S8, a transmission signal TS5a is generated and the combined wave TW5a is transmitted. In the ninth transmission period S9, a transmission signal TS5b is generated and the combined wave TW5b is transmitted. In other words, in the fourth embodiment, one cycle of a target deriving process is defined as a time period from a time point t0 to a time point t9 that is a sum of a first transmission period S1 to a fifth transmission period S5, the eighth transmission period S8 to the ninth transmission period S9 and a first processing period P1 to a second processing period P2, and the cycle is repeated.

Thus, the transmission waves TW1 to TW4 corresponding to the transmission signals TS1 to TS4 are transmitted in order. Also, the combined wave TW5 corresponding to the transmission signal TS5, the combined wave TW5a corresponding to the transmission signal TS5a and the combined wave TW5b corresponding to the transmission signal TS5b are transmitted. Accordingly, the radar apparatus 1b derives target information of targets located in different positions in a vertical direction relative to the reference axis Ce.

As described above, in the fourth embodiment, the radar apparatus 1b transmits the transmission waves in order from the individual transmitting antennas of the transmitting antenna 40 and transmits the transmission waves substantially simultaneously from the four transmitting antennas of the transmitting antenna 40. Then, the radar apparatus 1b transmits the combined wave TW5. Moreover, the radar apparatus 1b transmits the combined wave TW5a at the third transmission timing (the eighth transmission period S8) and transmits the combined wave TW5b at the fourth transmission timing (the ninth transmission period S9). Thus, the radar apparatus 1b is configured to shift a direction in which the combined wave TW5 is transmitted, from the traveling direction of the host vehicle CR to at least one of the direction upper than the reference axis Ce and the direction lower than the reference axis Ce. Moreover, the target information of the upper target UOb and the lower target DOb in relatively long distances away from the host vehicle CR can be early derived by the radar apparatus 1b.

Fifth Embodiment

Next, a fifth embodiment is described. In the fourth embodiment described above mainly explains that the phase adjuster 44 adjusts the phases of the first paired antennas and the phases of the second paired antennas, and thus the combined wave TW5a is transmitted in the obliquely upward direction and the combined wave TW5b is transmitted in the obliquely downward direction. In the fifth embodiment, phases of transmission signals are adjusted such that a combined wave is transmitted in at least one of a traveling direction of a host vehicle CR and a direction different from the traveling direction of the host vehicle CR, such as an obliquely rightward direction relative to a reference axis Ce and an obliquely leftward direction relative to the reference axis Ce. A configuration and a process of a radar apparatus 1b in the fifth embodiment is substantially the same as the configuration and the process of the radar apparatus 1b in the fourth embodiment. A difference in the configuration and the process from the fourth embodiment is mainly described below.

5-1. Transmission Range

Figure 17A:
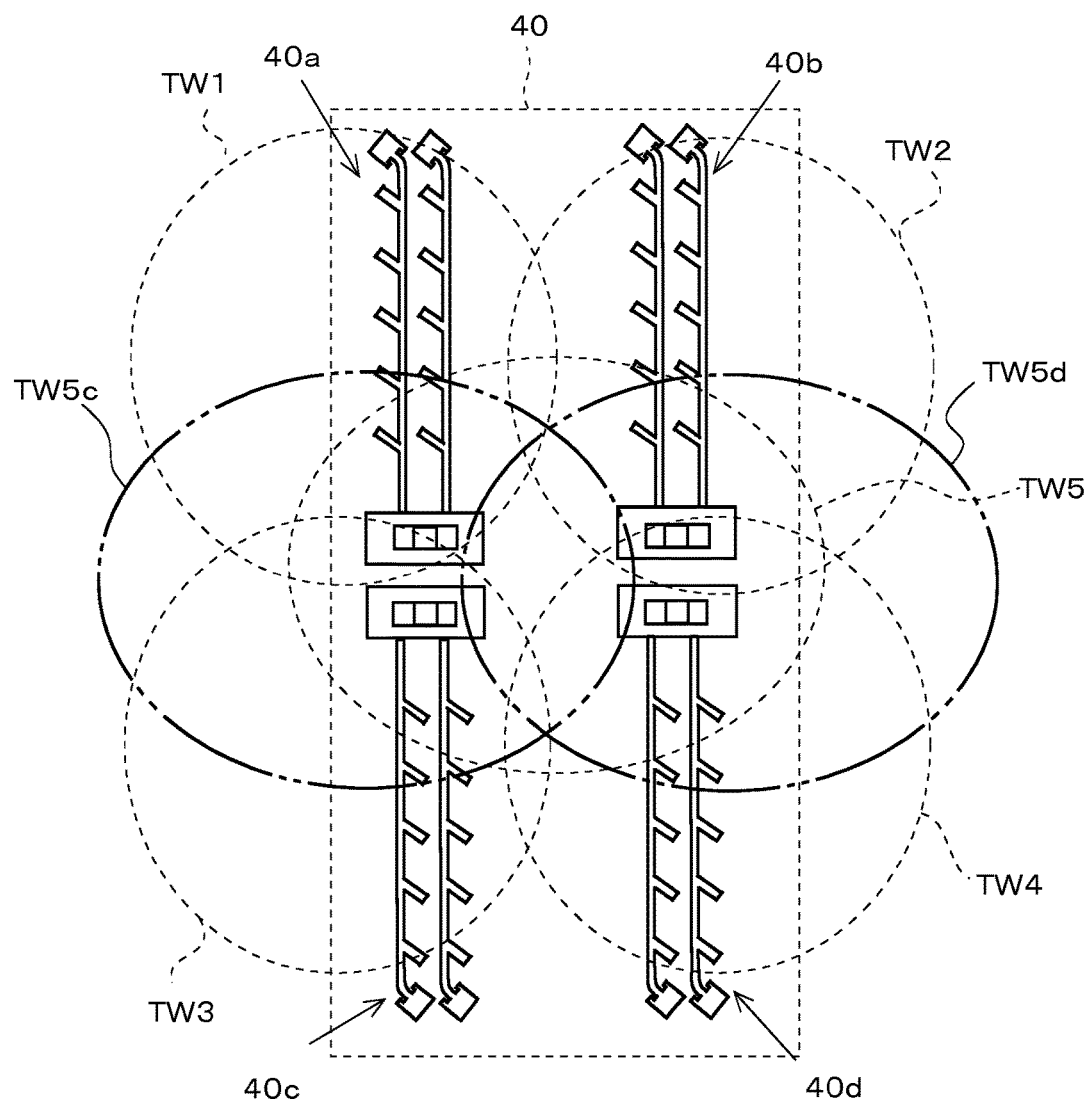
FIG. 17A illustrates a transmitting antenna viewed toward a rear side from a viewpoint located in front.
Figure 17A:
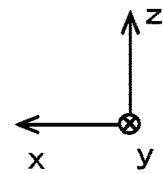

Next explained are transmission ranges of transmission waves of a transmitting antenna 40 in the fifth embodiment. FIG. 17A illustrates the transmitting antenna 40 viewed toward a rear side of the host vehicle CR from a viewpoint located in front of the host vehicle CR. A combined wave TW5c and a combined wave TW5d are generated by adjusting the phases of the transmission waves substantially simultaneously transmitted from four transmitting antennas of the transmitting antenna 40. The phases of the transmission waves are adjusted by a phase adjuster 44.

The phase adjuster 44 adjusts phases of transmission signals TS1 and TS3 at a predetermined timing (e.g. a fifth transmission timing) such that the phases thereof are behind phases of transmission signals TS2 and TS4. Thus, the combined wave TW5c is transmitted in the obliquely rightward direction relative to the reference axis Ce. The transmission signals TS1 and TS3 correspond to transmission waves of a third paired antennas of transmitting antennas 40a and 40c. The transmission signals TS2 and TS4 correspond to transmission waves of a fourth paired antennas of transmitting antennas 40b and 40d.

The phase adjuster 44 adjusts the phases of the transmission signals TS2 and TS4 at a predetermined timing immediately after the fifth transmission timing (e.g. a sixth transmission timing) such that the phases thereof are behind the phases of the transmission signals TS1 and TS3. Thus, the combined wave TW5d is transmitted in the obliquely leftward direction relative to the reference axis Ce.

Figure 17B:
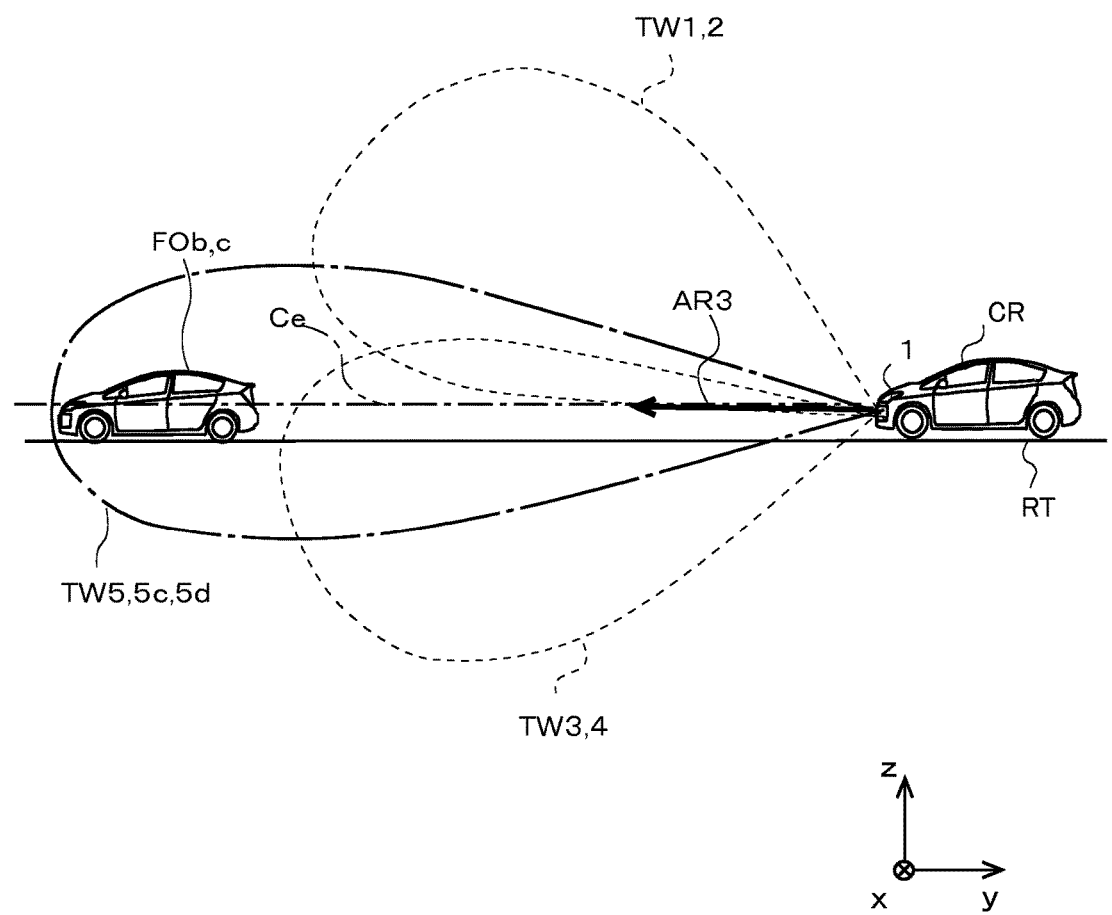
FIG. 17B illustrates a host vehicle viewed from a left side to a right side of the host vehicle.

FIG. 17B illustrates the host vehicle CR viewed from a left side to a right side of the host vehicle CR. The four transmitting antennas of the transmitting antenna 40 transmit the combined waves TW5c and TW5d of which the phases are adjusted, in a direction shown by an arrow AR3. The direction shown by the arrow AR3 is a direction in which a reference axis Ce extends and is a direction in which the combined wave TW5 is transmitted. Maximum vertical angle ranges of the combined waves TW5c and TW5d are, for example, 6° relative to the reference axis Ce. Therefore, the transmission ranges of the combined waves TW5c and TW5d are narrower than the transmission ranges of the transmission waves TW1 to TW4 having a maximum vertical angle range of 12°.

Longitudinal distances of the combined waves TW5c and TW5d are greater than longitudinal distances L1 of the transmission waves TW1 to TW4. Each of the longitudinal distance L1 is, for example, 60 m. On the other hand, each of the longitudinal distances of the combined waves TW5c and TW5d is, for example, 100 m.

Figure 17C:
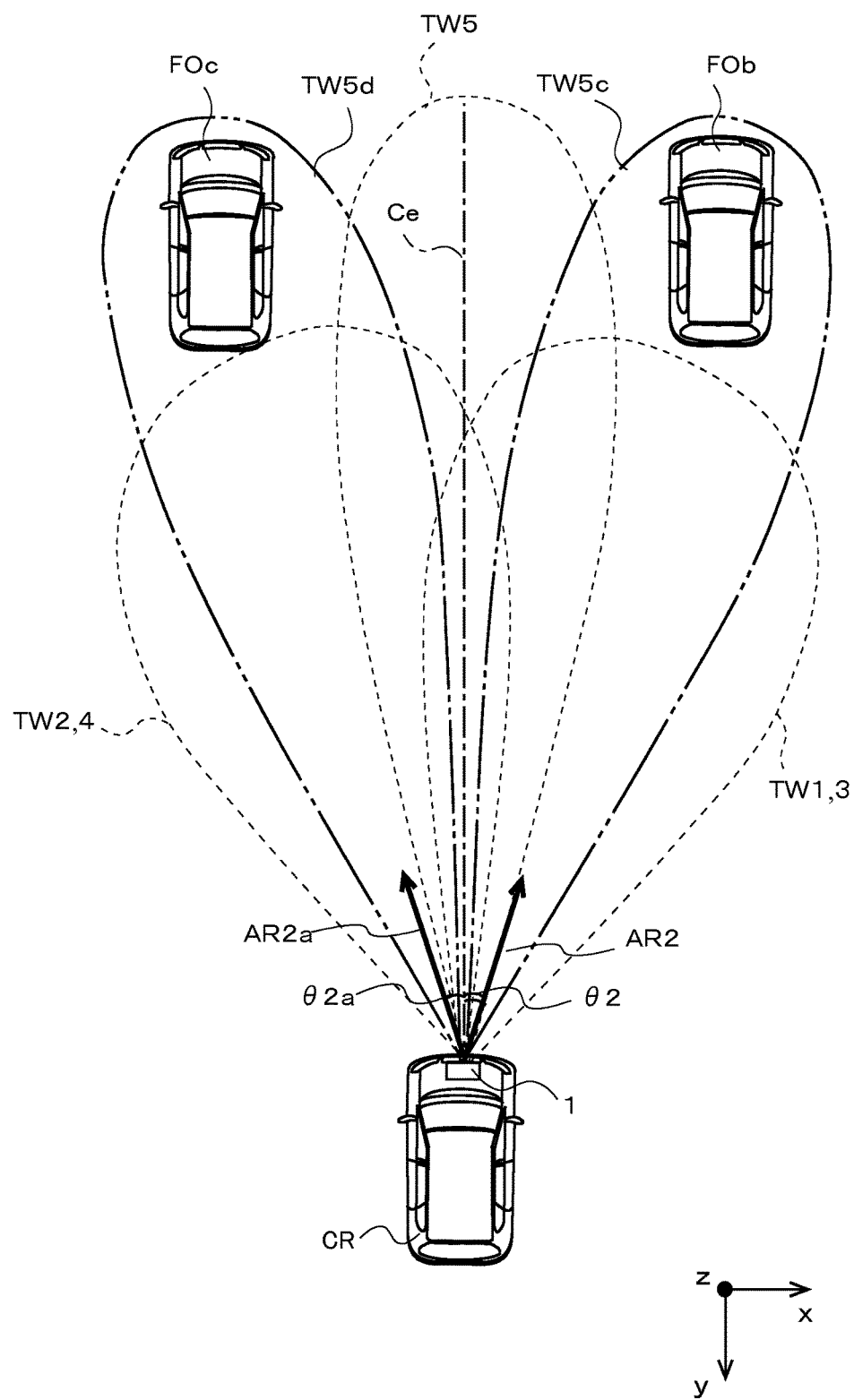
FIG. 17C illustrates the host vehicle viewed downward from a viewpoint located above the host vehicle.

FIG. 17C illustrates the host vehicle CR viewed downward from a viewpoint located above the host vehicle CR. The four transmitting antennas of the transmitting antenna 40 transmit the combined waves TW5c in a direction shown by an arrow AR2 and the combined wave TW5d in a direction shown by an arrow AR2a. Maximum horizontal angle ranges of the combined waves TW5c and TW5d are, for example, 10°. Therefore, the transmission ranges of the combined waves TW5c and TW5d are narrower than the transmission ranges of the transmission waves TW1 to TW4 having a maximum horizontal angle range of 25°.

Figure 18:
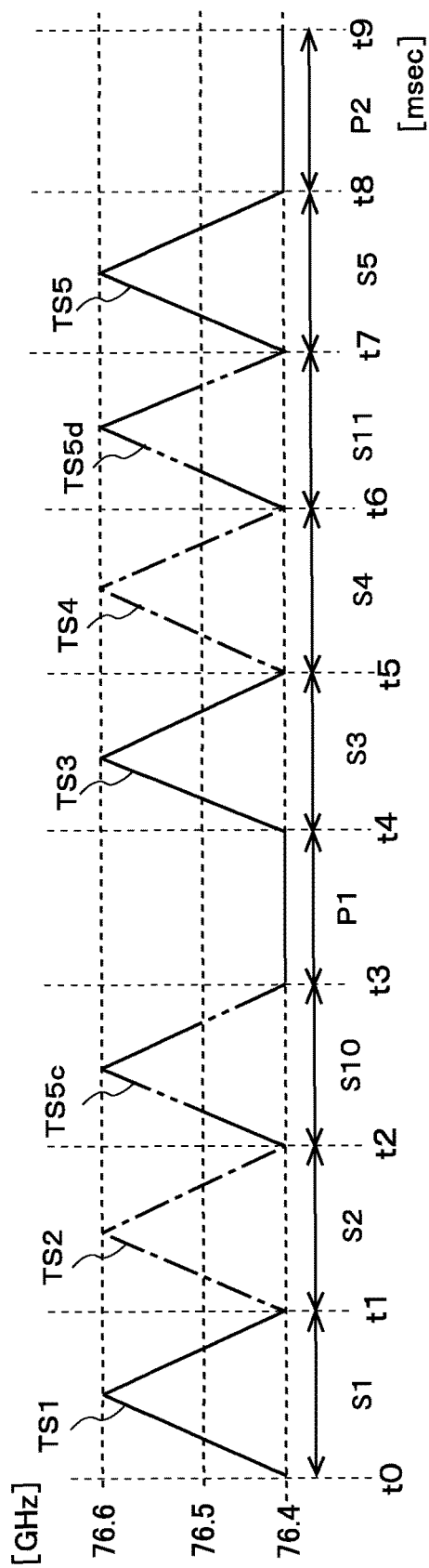
FIG. 18 illustrates timings when a transmitting antenna transmits transmission waves.

Thus, the radar apparatus 1b includes a control-required target FOb, a control-required target FOc, etc. in at least one of the transmission ranges of the combined waves TW5c and TW5d although the control-required target FOb, the control-required target FOc, etc. are not included in the transmission ranges of the transmission waves TW1 to TW4 due to existing in relatively long distances away from the host vehicle CR. Thus, the radar apparatus 1b derives target information of the target in the relatively long distance away. Moreover, appropriate vehicle control can be performed by the vehicle controller 2 based on the target information acquired from the radar apparatus 1b 5-2. Transmission Timing of Transmission Waves Next described are timings when the transmitting antenna 40 transmits the transmission waves in the fifth embodiment. FIG. 18 illustrates the timings when the transmitting antenna 40 transmits the transmission waves. In the fifth embodiment, the radar apparatus 1b transmits the transmission wave in a tenth transmission period S10 (from a time point t2 to a time point t3) and also transmits the transmission wave in an eleventh transmission period S11 (from a time point t6 to a time point t7) in addition to the first transmission period 51 to the fifth transmission period S5 in the second embodiment.

In the tenth transmission period S10, a transmission signal TS5c is generated and the combined wave TW5c is transmitted. In the eleventh transmission period S11, a transmission signal TS5d is generated and the combined wave TW5d is transmitted. In other words, in the fifth embodiment, one cycle of a target deriving process is defined as a time period from a time point t0 to a time point t9 that is a sum of a first transmission period S1 to a fifth transmission period S5, the tenth transmission period S10 to the eleventh transmission period S11 and a first processing period P1 to a second processing period P2, and the cycle is repeated.

Thus, the transmission waves TW1 to TW4 corresponding to the transmission signals TS1 to TS4 are transmitted in order. Also, the combined wave TW5 corresponding to the transmission signal TS5, the combined wave TW5c corresponding to the transmission signal TS5c and the combined wave TW5d corresponding to the transmission signal TS5d are transmitted. Accordingly, the radar apparatus 1b derives the target information of the target.

As described above, in the fifth embodiment, the radar apparatus 1b transmits the transmission waves in order from the individual transmitting antennas of the transmitting antenna 40 and transmits the transmission waves substantially simultaneously from the four transmitting antennas of the transmitting antenna 40. Then, the radar apparatus 1b transmits the combined wave TW5. Moreover, the radar apparatus 1b transmits the combined wave TW5c at the fifth transmission timing (the tenth transmission period S10) and transmits the combined wave TW5d at the sixth transmission timing (the eleventh transmission period S11). Thus, the radar apparatus 1b is configured to shift a direction in which the combined wave TW5 is transmitted, from a traveling direction of the host vehicle CR to at least one of the obliquely rightward direction and the obliquely leftward direction. Moreover, the target information of the control-required target FOb and the control-required target FOc in relatively long distances away from the host vehicle CR can be early derived by the radar apparatus 1b.

MODIFICATIONS

The embodiments of the invention are described above. However, the invention is not limited to the foregoing embodiments, but various modifications are possible. Such modifications are hereinafter described. Any of all the foregoing embodiments and the forms below may be combined with another arbitrarily.

The foregoing second embodiment describes the example that the four transmitting antennas of the transmitting antenna 40 transmit the transmission waves substantially simultaneously. On the other hand, number of the antennas is not limited to four. For example, three antennas may transmit transmission waves. For example, in a case where three transmitting antennas 40a, 40b and 40c transmit transmission waves substantially simultaneously, a combine wave is transmitted in an right-upward direction relative to a reference axis Ce over a relatively long distance. As described above, the radar apparatus 1a transmits a combined wave in a desired direction.

Further, numbers of the transmitting antenna 40 and the plural receiving antennas 51 in the forgoing embodiments are only examples and may be more or be less as long as the objects of the embodiments can be achieved. Further, numbers of the transmission lines TL and the plural antenna elements LF included in the transmitting antenna 40 and the plural receiving antennas 51 in the forgoing embodiments are only examples and may be more or be less as long as the objects of the embodiments can be achieved.

Further, in the foregoing embodiment, the radar apparatus 1 is mounted on the vehicle. However, the radar apparatus 1 may be used for others, such as airplanes, ships, boats and the like, besides a vehicle.

In the foregoing embodiment, the various functions are implemented by software using the CPU executing the arithmetic processing in accordance with the program. However, a part of the functions may be implemented by an electrical hardware circuit. Contrarily, a part of functions implemented by hardware may be implemented by software.

While the invention has been shown and described in detail, the foregoing description is in all aspects illustrative and not restrictive. It is therefore understood that numerous other modifications and variations can be devised without departing from the scope of the invention.

What is claimed is:

1. An antenna that transmits a transmission wave, the antenna comprising:
    a plurality of transmitting antennas including:
    a first transmitting antenna that transmits a first transmission wave having a first transmission range in a right-upward direction relative to a reference axis substantially parallel to a road surface;
    a second transmitting antenna that transmits a second transmission wave having a second transmission range in a left-upward direction relative to the reference axis;
    a third transmitting antenna that transmits a third transmission wave having a third transmission range in a right-downward direction relative to the reference axis; and
    a fourth transmitting antenna that transmits a fourth transmission wave having a fourth transmission range in a left-downward direction relative to the reference axis, wherein
    the first, second, third and fourth transmission ranges all partially overlap each other, and
    the plurality of transmitting antennas transmit the first-fourth transmission waves in order in a first time period and transmit the first-fourth transmission waves substantially simultaneously in a second time period that is different from the first time period.

2. The antenna according to claim 1, wherein
the plurality of transmitting antennas transmit a combined wave in a traveling direction of a vehicle on which the antenna is mounted, by transmitting the first-fourth transmission waves substantially simultaneously in the second time period.

3. The antenna according to claim 1, wherein
the first transmitting antenna and the second transmitting antenna transmit the first and second transmission waves substantially simultaneously in a third time period that is different from the first and second time periods, and
the third transmitting antenna and the fourth transmitting antenna transmit the third and fourth transmission waves substantially simultaneously in a fourth time period that is different from the first, second and third time periods.

4. The antenna according to claim 1, further comprising:
a phase adjuster that adjusts a phase of transmission signals of the first-fourth transmission waves, wherein
in a case where the plurality of transmitting antennas transmit at least some of the first-fourth transmission waves substantially simultaneously, the phase adjuster adjusts at least one of 1) the phases of the transmission signals supplied to the first transmitting antenna and the second transmitting antenna and 2) the phases of the transmission signals supplied to the third transmitting antenna and the fourth transmitting antenna, such that the phases of the transmission signals supplied to the first transmitting antenna and the second transmitting antenna are different from the phases of the transmission signals supplied to the third transmitting antenna and the fourth transmitting antenna, so that a combined wave is transmitted in one of an obliquely upward direction and an obliquely downward direction relative to the reference axis.

5. The antenna according to claim 1, further comprising:
a phase adjuster that adjusts a phase of transmission signals of the first-fourth transmission waves, wherein
in a case where the plurality of transmitting antennas transmit at least some of the first-fourth transmission waves substantially simultaneously, the phase adjuster adjusts at least one of 1) the phases of the transmission signals supplied to the first transmitting antenna and the third transmitting antenna and 2) the phases of the transmission signals supplied to the second transmitting antenna and the fourth transmitting antenna, such that the phases of the transmission signals supplied to the first transmitting antenna and the third transmitting antenna are different from the phases of the transmission signals supplied to the second transmitting antenna and the fourth transmitting antenna, so that a combined wave is transmitted in one of an obliquely leftward direction and an obliquely rightward direction relative to the reference axis.

6. A radar apparatus that derives target information of a target, the radar apparatus comprising:
the antenna according to claim 1; and
a signal processor that derives the target information from an output of the antenna.

7. A vehicle control system that controls a vehicle, the vehicle control system comprising:
the radar apparatus according to claim 6; and
a vehicle controller that controls the vehicle based on the target information derived by the radar apparatus.

8. The antenna according to claim 1, wherein the reference axis is horizontal, and none of the transmitting antennas of the antenna transmits a transmission wave along the reference axis which is horizontal.

* * * * *